United States Patent
Oh et al.

(10) Patent No.: US 7,908,466 B2
(45) Date of Patent: Mar. 15, 2011

(54) METHOD AND APPARATUS FOR BOOTING A MICROPROCESSOR SYSTEM USING BOOT CODE STORED ON A SERIAL FLASH MEMORY ARRAY HAVING A RANDOM-ACCESS INTERFACE

(75) Inventors: Jee-Woong Oh, Yongin-si (KR); Eun-Seok Chae, Yongin-si (KR); Shin-Kyu Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1026 days.

(21) Appl. No.: 11/554,627

(22) Filed: Oct. 31, 2006

(65) Prior Publication Data

US 2007/0113067 A1 May 17, 2007

(30) Foreign Application Priority Data

Nov. 15, 2005 (KR) .................. 10-2005-0108911

(51) Int. Cl.
*G06F 12/00* (2006.01)
(52) U.S. Cl. ............... 713/1; 713/2; 713/100; 711/103; 711/209
(58) Field of Classification Search ............ 713/1, 2, 713/100; 711/103, 209
See application file for complete search history.

(56) References Cited

U.S. PATENT DOCUMENTS

| | | | |
|---|---|---|---|
| 6,604,235 B1 | 8/2003 | Harrison et al. | |
| 7,302,517 B2 * | 11/2007 | Lim et al. | 711/103 |
| 7,308,570 B2 * | 12/2007 | Young et al. | 713/2 |
| 7,413,953 B2 * | 8/2008 | Choi | 438/257 |
| 2004/0230738 A1 * | 11/2004 | Lim et al. | 711/103 |
| 2005/0080986 A1 * | 4/2005 | Park | 711/103 |
| 2005/0185472 A1 * | 8/2005 | Randell et al. | 365/185.33 |
| 2006/0146817 A1 * | 7/2006 | Lim | 370/389 |
| 2007/0022242 A1 * | 1/2007 | Cheng | 711/103 |
| 2007/0239977 A1 * | 10/2007 | Wu | 713/2 |

FOREIGN PATENT DOCUMENTS

| | | |
|---|---|---|
| CN | 1517884 | 8/2004 |
| EP | 1 387 284 | 2/2004 |
| EP | 1 519 304 | 3/2005 |
| KR | 1020030074106 | 9/2003 |
| KR | 1020040011657 | 2/2004 |
| KR | 1020040064149 | 7/2004 |
| KR | 1020050028752 | 3/2005 |
| KR | 1020050065431 | 6/2005 |

OTHER PUBLICATIONS

Office Action dated Jun. 2, 2010 from the Chinese Patent Office for corresponding Chinese Patent Application No. 200610063903.X.

(Continued)

*Primary Examiner* — Abdelmoniem Elamin
(74) *Attorney, Agent, or Firm* — F. Chau & Associates, LLC

(57) ABSTRACT

A method and apparatus for booting a microprocessor system using a serial (e.g., NAND-type) flash memory array having a random-access (parallel, e.g., NOR-flash type) interface. The method includes loading a boot code loader stored in the serial (e.g., NAND-type) flash memory array into a RAM when power is turned on, according to a routine of a read-only memory (ROM) of the microprocessor; loading boot code stored in the serial flash memory into an internal or external (main) RAM of the microprocessor according to the boot code loader; loading application code stored in the serial flash memory into the main (RAM) memory according to the boot code; and executing the application code. The system may be manufactured at a low cost compared to NOR-Flash based systems, while ensuring flexibility of a microprocessor.

36 Claims, 16 Drawing Sheets

OTHER PUBLICATIONS

"Booting. The Boot Sequence of a Computer", Wikipedia, The Free Encyclopedia, (Online), Feb. 6, 2005, pp. 1-3, XP002416833, URL:http://web.archive.org/web/20050206190513/http://en.wikipedia.org/wiki/Booting>.

European Search Report from corresponding European Application No. 06023697.3.

* cited by examiner

METHOD AND APPARATUS FOR BOOTING A MICROPROCESSOR SYSTEM USING BOOT CODE STORED ON A SERIAL FLASH MEMORY ARRAY HAVING A RANDOM-ACCESS INTERFACE

CROSS-REFERENCE TO RELATED APPLICATIONS

This application claims priority, under 35 USC §119, of Korean Patent Application No. 2005-108911, filed on Nov. 15, 2005, in the Korean Intellectual Property Office, the entire contents of which are herein incorporated by reference.

BACKGROUND OF THE INVENTION

1. Field of the Invention

The present invention relates to a method and an apparatus for booting a microprocessor system using a flash memory device storing boot code, and more particularly to a method and an apparatus for booting a microprocessor system using a serial (e.g., NAND) flash memory device including a RAM buffer having a random-access interface.

2. Description of the Related Art when a mobile computing device, such as a mobile phone, a personal digital assistant (PDA), a portable multimedia player (PMP) or a laptop computer, or a general computing device, such as a desktop computer, is turned on, a booting process is started. In the booting process, internal elements (e.g., registers, RAM) are initialized and application code, for example, an operating system (OS) program, stored in a non-volatile storage device (e.g., a hard disc drive, HDD) is transferred (loaded, copied) to a main (Random Access Memory, RAM) processor memory for execution by the microprocessor.

In the past, a read-only memory (ROM) was provided as a storage device for storing boot code (e.g., BIOS, Basic Input/Output System) including routines for booting the system. The primary function of BIOS is to prepare the machine so other software programs stored on various media (such as hard drives, floppies, and CDs) can load, execute, and assume control of the computer. This process is known as booting up. Alternatively, an erasable programmable read-only memory (EPROM) was provided as the storage device for storing boot code in order to facilitate updating of the boot code. More recently, semiconductor and other solid state storage devices capable of writing and electrically erasing data are being used for storing executable code for booting systems. For example, an electrically erasable programmable read-only memory (EEPROM), a NOR flash memory, a divided bit-line NOR (DINOR) flash memory (which has a modified structure of a NOR flash memory), a NAND flash memory and/or an AND flash memory are used. The four primary architectures for flash memory design are NOR, NAND, AND, and DINOR.

The EEPROM, the NOR flash memory and the DINOR flash memory are similar in that they each provide a contact electrode for each bit line, and each cell is connected to a bit line, so that the EEPROM, the NOR flash memory and the DINOR flash memory may read and write arbitrary address data irrespective of the order that the data is stored in the cells (random access of the memory). A non-volatile semiconductor device, such as the EEPROM, the NOR flash memory or the DINOR flash memory, in which the cells are arranged in parallel between bit lines and ground lines, may be referred to as a parallel flash memory.

On the other hand, the NAND flash memory or the AND flash memory, in which the cells are connected in series between the bit lines and ground lines, may be referred to as a serial flash memory. The degree of integration (circuit density) of the serial flash memory may be higher than that of the parallel flash memory. The efficiencies of NAND flash memory devices are due to the lack of metal contacts in the NAND cell string. NAND flash memory cell size is smaller than NOR flash memory cell size, due to the fact that NOR cells require a separate metal contact for each cell. Despite a high degree of integration (circuit density), the serial (e.g., NAND) flash memory has a limitation in that byte-unit operations (random access of individual bytes) may be impossible. Thus, the parallel flash memory is conventionally employed as a code executing device, and the serial flash memory is conventionally employed as a data storage device. NAND flash's advantages are fast write (program) and erase operations, and conventionally, NOR flash's advantages are random access and byte write capability. NOR flash's random access ability allows for execution in place (XiP) of code stored therein, which is often a requirement in embedded applications.

FIGS. 1 and 2 are block diagrams illustrating conventional booting systems. FIG. 1 illustrates a conventional booting system using a parallel (NOR) flash memory and FIG. 2 illustrates a conventional booting system using a serial (NAND) flash memory.

Referring to FIG. 1, when power of a system is powered on, OS boot code is transferred (loaded, copied) from a NOR flash memory 12 to a main controller (microprocessor) 10 through a system bus 11. The main controller 10 performs a booting process according to a routine in the OS boot code with random access of individual bytes stored in the parallel (NOR) flash memory, and so a boot loader having a routine for loading an OS image into a main memory may not be needed. An OS image necessary for the booting process may be included in the OS boot code to be provided to the main controller 10. In addition, the OS image may also be stored in a non-volatile storage device such as a hard disk drive. The main controller 10 performs loading of the OS image into the main memory 13 according to a routine in the OS boot code.

Referring to FIG. 2, when the system is powered on, a main controller (microprocessor) 20 performs reading of a boot loader stored in a boot ROM 23. Random access or execution in place (XiP) of individual bytes of code may not be possible in the serial (NAND) flash memory, and so a boot loader having a routine for loading an OS image into a main memory may be needed. The main controller 20 performs loading of an OS image stored in a NAND flash memory 25 into a main memory 21, according to a routine of the boot loader copied from the boot ROM 23. The OS image is loaded into the main memory 21. A NAND flash controller 24 performs transferring of commands and data received from a system bus 22 to the NAND flash memory 25, and provides data transferred from the NAND flash memory 25 to the system bus 22.

Some booting systems include OS boot code or a boot loader in an internal ROM, while other booting systems obtain the OS boot code or the boot loader from an external device of a microprocessor, namely, a main controller of a memory.

FIG. 3 is a block diagram illustrating a conventional booting system.

Referring to FIG. 3, the booting system includes a microprocessor 30, a NAND flash controller 40, a NAND flash memory 45, and a main memory 50.

The microprocessor 30 includes a central processing unit (CPU) core 31, an internal ROM 32 storing a boot loader, an internal RAM 33, and an interface 35.

When power is turned on, the CPU core 31 accesses the internal ROM 32 through the internal bus 34, so that the boot loader stored in the internal ROM 32 is executed. The microprocessor 30 copies (loads) an OS image stored in the NAND flash memory 45 into the main memory 50, according to (by executing) a routine of the boot loader. The NAND flash controller 40 operatively connects (interfaces) the NAND flash memory 45 with a system bus 60.

The ROM 33 included in the microprocessor 30 typically stores initialization code that initializes a subsystem of a CPU core, code for booting a system, and monitor-program code that downloads application code from a flash memory, and so on. Because the code for booting the system (boot code) is stored in the internal ROM, the booting system may be safe from hacking or from errors that may be generated from an updating process of the OS image. In addition, a developer of the booting system may protect proprietary (e.g., trade-secret) code or information by including the confidential library modules in the internal ROM.

Recently, both NOR flash memories and NAND flash memories have been employed as external storage device of a microprocessor used (like a hard drive) for storing application code necessary for booting in a booting systems using boot code stored in an internal ROM.

The NOR flash memory supports random access of stored code, but prices of the NOR flash memory are high. Computing devices accommodating ever larger sized application code are constantly being developed, and thus the prices of the computing devices are rising due to the high prices of the larger NOR flash memory used to store the large application code.

Prices of NAND flash memory are typically lower than that of the NOR flash memory, but conventional NAND flash memory does not support random access of data (e.g., executable code) stored therein. Thus, in a case where a booting system uses NAND flash memory, boot code may be stored in an internal ROM 32 as shown in FIG. 3, or in an external ROM 23 as shown in FIG. 2, so as to transfer application code stored in the NAND flash memory to a main memory for random access execution (e.g., execution in place). When the boot code is stored in the internal ROM (32 as shown in FIG. 3), a microprocessor including the internal ROM 32 may be dependent upon the exact configuration of the NAND flash memory, so that flexibility of the microprocessor may be decreased. Therefore, a method of booting a microprocessor system (e.g., a microprocessor system including an internal ROM) using relatively inexpensive serial flash memory, such as the NAND flash memory, while ensuring the flexibility of the microprocessor is needed.

SUMMARY OF THE INVENTION

Exemplary embodiments of the present invention provide a method of booting a system using an inexpensive flash memory device (e.g., a NAND flash memory) while ensuring flexibility of a microprocessor, and a booting system using boot code stored in the flash memory device.

Exemplary embodiments of the present invention provide a flash memory device (e.g., including a NAND flash array) having a random access (e.g., parallel flash type) interface, for the booting system. Other embodiments of the present invention provide a microprocessor system using an inexpensive serial flash memory (e.g., a NAND flash memory) having a random access interface, for storing boot code and for booting the system. Exemplary embodiments of the present invention also provide a method of updating a boot code in a microprocessor system using an inexpensive serial flash memory (e.g., a NAND flash memory) for booting the system.

A first aspect of the present invention provides a method of booting a microprocessor system using a serial flash memory array communicatively coupled to a RAM buffer having a random-access interface. The method includes executing a boot code loader (that has been loaded into the RAM buffer from the serial flash memory when power is turned on), according to a routine of a ROM of the microprocessor (e.g., an internal ROM of the microprocessor); transferring boot code stored in the serial flash memory array to an internal RAM in the microprocessor according to (by executing) the boot code loader; transferring application code stored in the serial flash memory array to a main memory according to (by executing) the boot code; and executing the application code.

The method may further include determining whether a cable for updating the serial flash memory device is connected to the microprocessor system, according to (by executing) a routine of the internal ROM; and jumping execution to the boot code loader (which is loaded into the RAM buffer) if the cable is not connected. The executing of the boot code loader may further include updating contents (e.g., boot code, application code, and user data) stored in the serial flash memory array when the cable is connected. The method (e.g., within the executing of the boot code loader) may further include receiving configuration information (e.g., non-executable information necessary for booting) from a flash configuration table (FCT) loaded into the RAM buffer (boot ram) upon a system reset (e.g., when the power is turned on), before the determining whether the cable is connected.

The transferring (loading, copying) of the application code stored in the serial flash memory array into the main memory may include initializing the main memory and then loading (e.g., copying) the application code into the main memory.

In exemplary embodiments of the present invention, a microprocessor booting system includes: a microprocessor having an internal ROM and an Internal RAM; a main memory (e.g., external RAM); and a flash memory device (e.g., a serial, NAND memory array) configured to store application code boot code and a boot code loader including a RAM buffer and a finite state machine configured to load the boot code loader into the RAM buffer when power is turned on, wherein the microprocessor is configured to execute the boot code loader (in the RAM buffer), according to (by executing a "jump" command in) a routine of the internal ROM, to transfer the boot code to the internal RAM (of the microprocessor) according to (by executing) a routine of the boot code loader, and transfers the application code to the main memory according to (by executing) a routine of the boot code, and then executes the application code.

The routine of (executable code stored in) the internal ROM may include: a determining procedure that determines whether a cable for updating the flash memory device is connected; and a jumping procedure that jumps program execution to the boot code loader (that has been loaded into the RAM buffer) when the (update) cable is not connected. The routine of (executable code stored in) the internal ROM may further include an updating procedure that updates the contents (e.g., boot code loaders boot code, application data, and flash configuration table) stored in flash memory device when the (update) cable is connected.

The routine of (executable code in) the boot code may include an initializing procedure that initializes the main memory and a loading (e.g., copying) procedure that loads (e.g., copies) the application code (from the serial, e.g. NAND, memory array) into the main memory.

The finite state machine may automatically load (copy) a flash configuration table (FCT) (stored in the serial, e.g., NAND, memory array) into the RAM buffer when the power is turned on, and the routine of (executable code in) the (internal) ROM further comprises a procedure for receiving information (e.g., information necessary for booting from a particular flash memory device) in the FCT loaded into (stored in) the RAM buffer, before determining whether the cable is connected.

In exemplary embodiments of the present invention, a serial flash memory device for booting a system includes a serial flash memory configured to store application code, boot code having a routine for transferring the application code to a main memory, and a boot code loader having a routine for transferring the boot code to an internal buffer in a microprocessor; a RAM buffer; and a finite state machine configured to load the boot code loader into the RAM buffer when power is turned on, wherein the boot code is transferred to the internal buffer in the microprocessor according to the routine of the boot code loader when the boot code loader loaded into the RAM buffer is executed, and the application code is transferred to the main memory according to the routine of the boot code when the boot code transferred to the internal buffer in the microprocessor is executed.

The routine of the boot code may include an initializing procedure that initializes the main memory, and a loading (e.g., copying) procedure that loads (e.g., copies) the application code into the main memory.

In exemplary embodiments of the present invention, a method of booting a system using a serial flash memory device having a parallel flash interface, includes executing boot code loaded into a RAM buffer when power is turned on, according to a routine of an internal ROM in a microprocessors transferring application code stored in the serial flash memory device to a main memory according to the boot code; and executing the application code.

The executing of the boot code may further include receiving information necessary for booting from an FCT loaded into the RAM buffer when the power is turned on.

The transferring of the application code to the main memory may include initializing the main memory; and loading (e.g., copying) the application code into the main memory.

In exemplary embodiments of the present invention, a booting system includes a microprocessor including an internal ROM; a main memory; and a serial flash memory device including a serial flash memory storing application code and boot code, a RAM buffer, and a finite state machine loading the boot code into the RAM buffer when power is turned on, wherein the microprocessor executes the boot code according to a routine of the internal ROM, transfers the application code to the main memory according to a routine of the boot code, and executes the application code.

The routine of the internal ROM may include a determining procedure that determines whether the boot code is loaded into the RAM buffer; and a jumping procedure that jumps to the boot code when the boot code is loaded into the RAM buffer.

The routine of the boot code may include an initializing procedure that initializes the main memory, and a loading (e.g., copying) procedure that loads (e.g., copies) the application code into the main memory.

In exemplary embodiments of the present invention, a method of booting a system using a serial flash memory device having a parallel flash interface, includes executing a boot code loader loaded into a RAM buffer when power is turned on, according to a routine of an internal ROM in a microprocessor; initializing a main memory according to the boot code loader; loading (e.g., copying) boot code stored in the serial flash memory device into the main memory according to the boot code loader, executing the boot code according to the boot code loader; loading (e.g., copying) application code stored in the serial flash memory device into the main memory according to the boot code; and executing the application code.

The executing of the boot code loader may include determining whether a cable for updating the serial flash memory device is connected, according to the routine of the internal ROM; and jumping to the boot code loader loaded into the RAM buffer when the cable is not connected. The executing of the boot code loader may further include updating the serial flash memory device when the cable is connected. The executing of the boot code loader may further include receiving information necessary for booting from an FCT loaded into the RAM buffer when the power is turned on, before determining whether the cable is connected.

In exemplary embodiments of the present invention, a booting system includes a microprocessor including an internal ROM; a main memory; and a serial flash memory device including a serial flash memory storing application code, boot code and a boot code loader, a RAM buffer, and a finite state machine loading the boot code loader into the RAM buffer when power is turned on, wherein the microprocessor executes the boot code loader according to a routine of the internal ROM, transfers the boot code to the main memory according to a routine of the boot code loader, transfers the application code to the main memory according to a routine of the boot code, and executes the application code.

The routine of the internal ROM may include a determining procedure that determines whether a cable for updating the serial flash memory device is connected; and a jumping procedure that jumps to the boot code loader loaded into the RAM buffer when the cable is not connected. The routine of the internal ROM may further include an updating procedure that updates the serial flash memory device when the cable is connected.

The finite state machine may perform loading of an FCT into the RAM buffer when the power is turned on, and the routine of the internal ROM further comprises a receiving procedure that receives information necessary for booting from the FCT loaded into the RAM buffer before determining whether the cable is connected.

In exemplary embodiments of the present invention, a serial flash memory device for booting a system includes a serial flash memory configured to store application code, boot code having a routine for transferring the application code to a main memory, and a boot code loader having a routine for transferring the boot code to an internal buffer in a microprocessor; a RAM buffer; and a finite state machine configured to load the boot code loader into the RAM buffer when power is turned on, wherein the boot code is transferred to the main memory according to the routine of the boot code loader when the boot code loader loaded into the RAM buffer is executed, and the application code is transferred to the main memory according to the routine of the boot code when the boot code is executed.

The routine of the boot code loader may include an initializing procedure that initializes the main memory, and a loading (e.g., copying) procedure that copies (loads) the boot code into the main memory.

In exemplary embodiments of the present invention, a method of updating a serial flash memory device including a serial flash memory and a RAM buffer, and having a parallel flash interface includes receiving information that causes to determine whether the serial flash memory device loaded into the RAM buffer is valid; checking whether an update cable is connected when the serial flash memory device is invalid; loading first update code transferred through the update cable into an internal buffer in a microprocessor when the update cable is connected; and programming first code transferred through the update cable in the serial flash memory, according to a routine of the first update code.

The first code may include application code; boot code having a routine for transferring the application code to a main memory; a boot code loader having a routine for transferring the boot code to the internal buffer in the microprocessor; and an FCT indicating a boot flag and a branch address of the application code, wherein the boot flag indicates a type of a default update cable.

The method may further include outputting an error message when the serial flash memory device is invalid and the update cable is not connected.

The method may further include checking whether a default update cable set in a boot flag is connected when the serial flash memory device is valid; loading second update code transferred through the default update cable into the internal buffer in the microprocessor when the default update cable is connected; and programming the second update code in the serial flash memory, according to a routine of the second update code.

The method may further include checking whether a non-default update cable is connected when the default update cable is not connected; loading third update code transferred through the non-default update cable into the internal buffer in the microprocessor when the non-default update cable is connected; and programming third code transferred through the non-default update cable in the serial flash memory, according to a routine of the third update code.

As a result, the method of booting a system according to the present invention may boot the system, with low costs, while ensuring flexibility of a microprocessor.

Detailed illustrative embodiments of the present invention are disclosed herein. However, specific structural and functional details disclosed herein are merely representative for purposes of describing exemplary embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives failing within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

BRIEF DESCRIPTION OF THE DRAWINGS

The present invention will become more apparent to those of ordinary skill in the art by describing, in detail, exemplary embodiments thereof with reference to the attached drawings, wherein like elements are represented by like reference numerals, and.

DETAILED DESCRIPTION OF THE EXEMPLARY EMBODIMENTS

Figure 4:
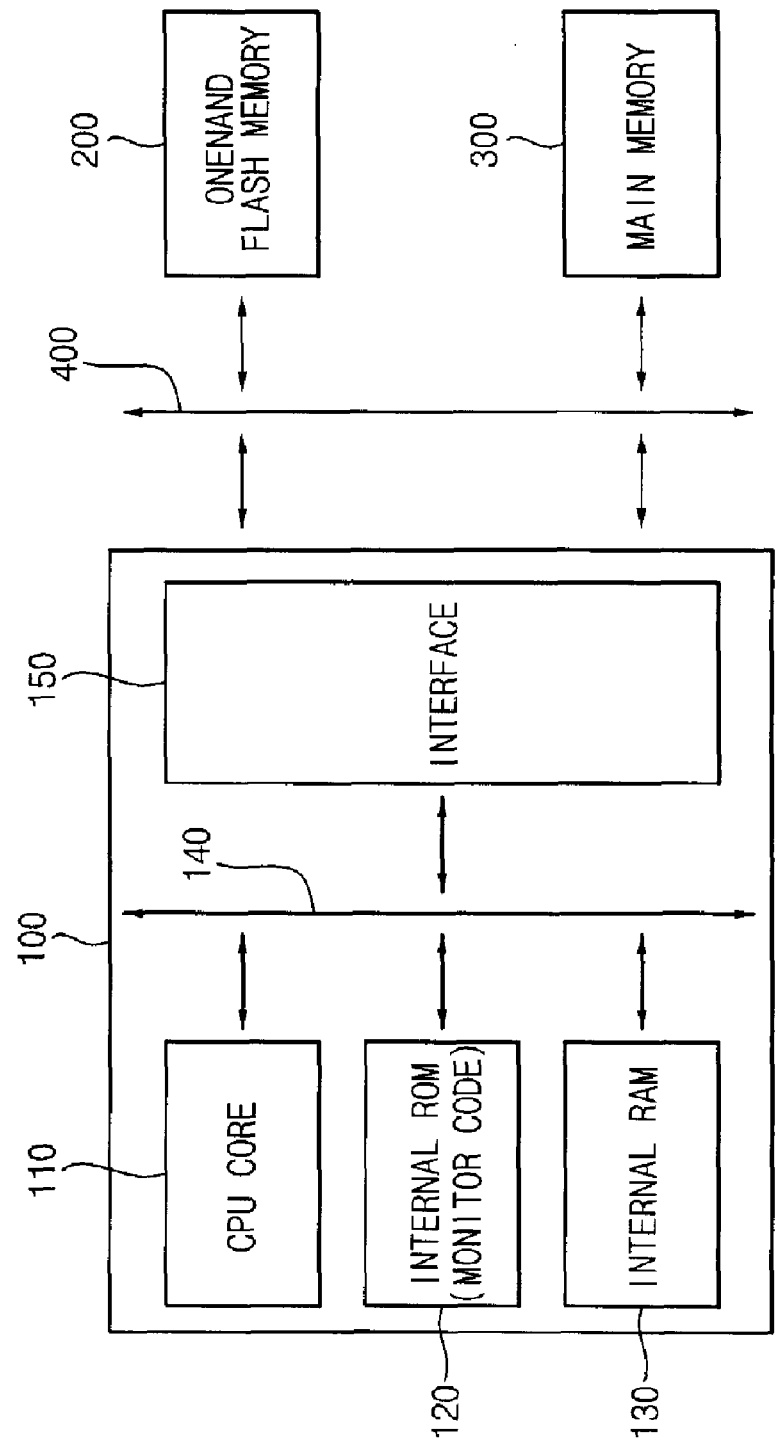
FIG. 4 is a block diagram illustrating a booting system according to an exemplary embodiment of the present invention.

FIG. 4 is a block diagram illustrating a booting system according to an exemplary embodiment of the present invention.

Referring to FIG. 4, the booting system may include a microprocessor 100, a serial flash memory device 200 and a main memory 300. The microprocessor 100, the serial flash memory device 200 and the main memory 300 may transfer and receive data and control signals through an external bus 400.

The microprocessor 100 may include a central processing unit (CPU) core 110, an internal read-only memory (ROM) 120, an internal random-access memory (RAM) 130 and an interface 150. In addition, the microprocessor 100 may further include an internal bus 140 connecting the CPU core 110, the internal ROM 120 and the internal RAM 130. The microprocessor 100 may be implemented as a system-on-a-chip (SOC).

The CPU core 110 may provide instructions for controlling the booting system and perform data processing for booting the system. An Advanced RISC Machine (ARM) core may be applied as the CPU core 110.

Figure 3:
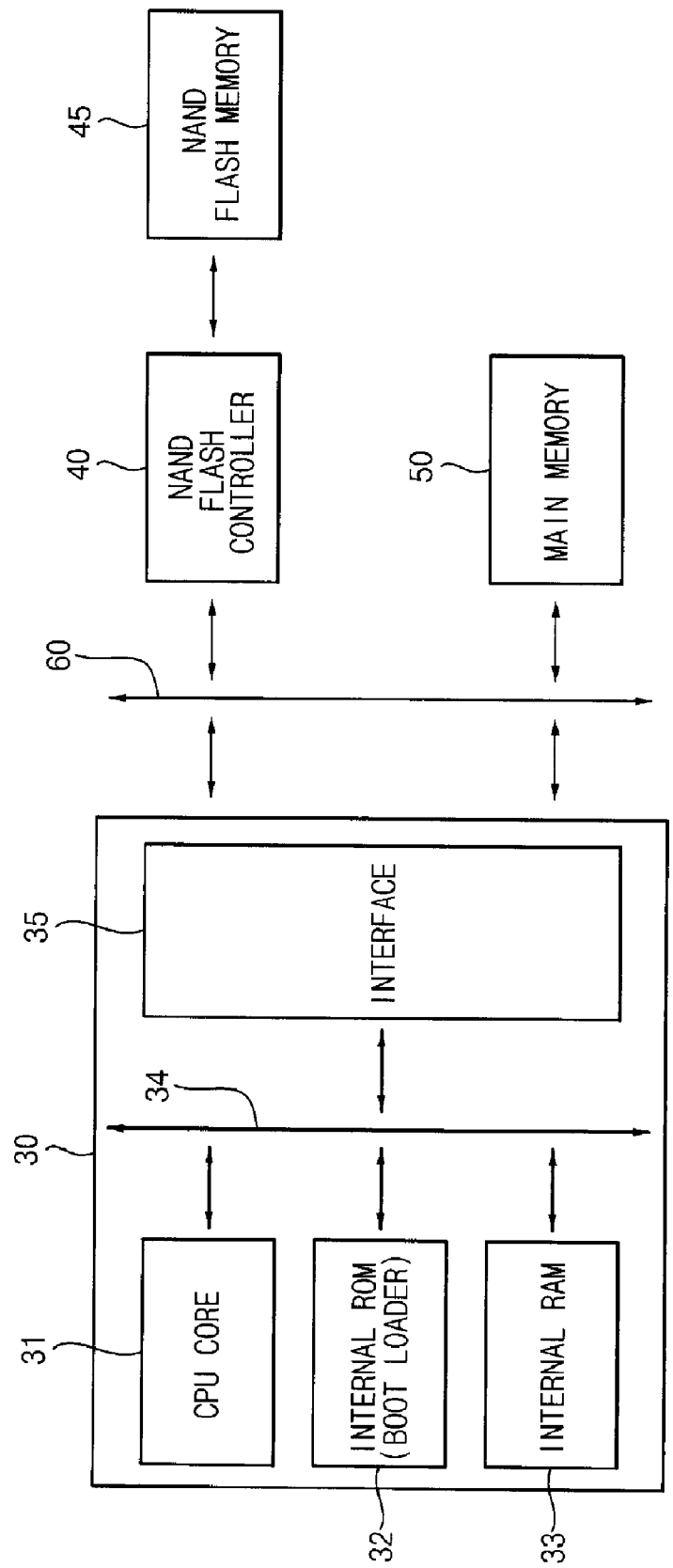

The internal ROM 120 may include code for initializing the microprocessor 100, code for monitoring the booting of the system and so on. The internal ROM 120 will be described in detail with reference to FIG. 3.

The internal RAM 130 may correspond to an internal buffer of the microprocessor 100 and have a high access speed.

The serial flash memory device 200 may include code necessary for booting and have a parallel flash interface. In preferred embodiments, a OneNAND™ flash memory device from Samsung Electronics Co., Ltd. may be employed to implement the serial flash memory device 200. The OneNAND flash memory device has a parallel interface (similar to a NOR-lash interface 210 in FIG. 6) and includes a NAND flash array (an array of NAND-flash memory cells 260 in FIG. 6). The OneNAND flash memory device includes a RAM buffer (220 in FIG. 6, e.g., formed by a static random-access memory (SRAM)) so as to support the parallel (NOR) interface. The serial flash memory device 200 (e.g., OneNAND memory device) may be implemented as a single-die chip that includes a standard parallel (NOR) Flash interface integrated with a NAND Flash Array. The serial flash memory device 200 (e.g., OneNAND memory device) may comprise interface logic and NAND Flash Array and internal Buffer RAM (220 in FIG. 6). The Buffer RAM may comprise a dedicated Boot Ram (222 in FIG. 6) portion reserved for boot codes and a dedicated Data RAM (221 in FIG. 6) portion for buffering data. The frequency of the internal operating clock (not shown) may exceed 54 MHz. OneNAND memory devices may have a ×16 parallel interface with Host (100), and have achieved speeds of ~76 ns random access time, and offer a programmable read latency. OneNAND memory devices provide a multiple sector read operation by assigning the number of sectors to be read in the sector counter register (in an internal register unit 240 in FIG. 6). The OneNAND memory device shown in FIG. 6 includes one (block-sized) OTP (One Time Programmable) (270 in FIG. 6), which can be used to increase system security or to provide product-identification capabilities.

The main memory 300 may store various types of application code such as an operating system (OS) program and an application program, data and instructions that are to be executed by the microprocessor (host) 100. A dynamic random-access memory (DRAM) may be employed as the main memory 300. Alternatively, an SRAM or other storage devices capable of random access may be applied as the main memory 300.

Figure 5:
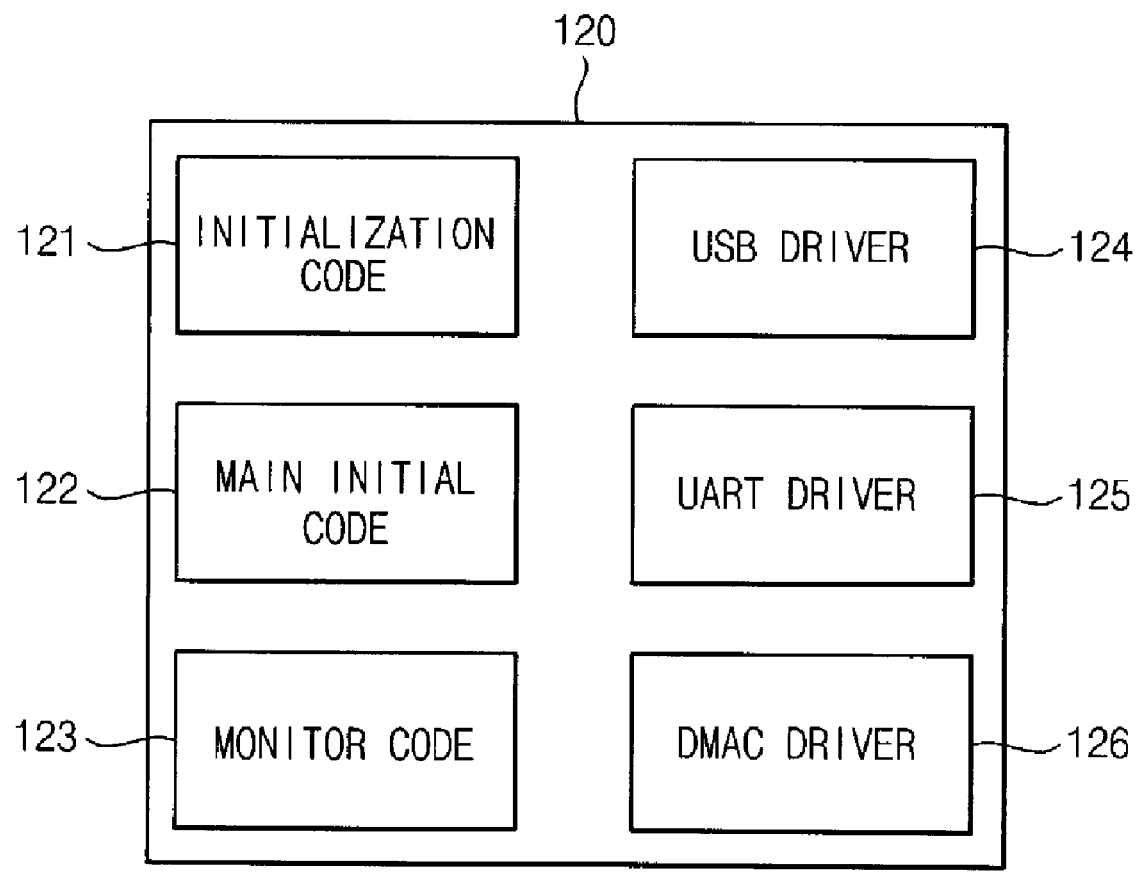
FIG. 5 is a memory map illustrating code stored in an internal ROM 120 within the serial flash memory device 200 shown in of FIGS. 4 and 6.
Figure 6:
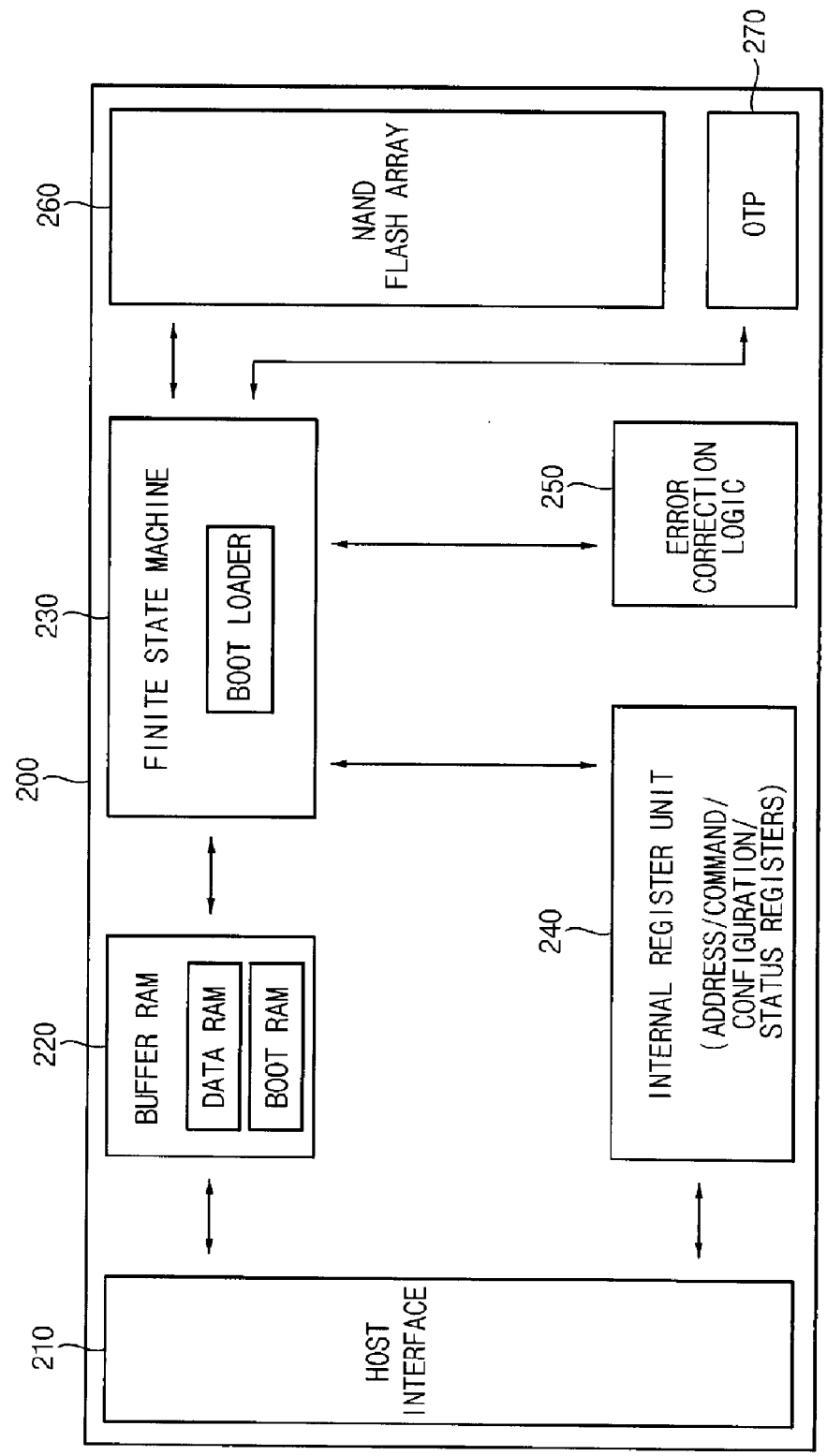
FIG. 6 is a detailed block diagram illustrating an exemplary implementation of the serial flash memory device 200 shown in FIG. 4.

FIG. 5 is a memory map illustrating code stored in an internal ROM within the serial flash memory device 200 of FIG. 6.

The internal ROM 120 may store initialization code 121, main initial code 122, monitor code 123 and at least one communication driver such as a universal serial bus (USB) driver 124, a universal asynchronous receiver-transmitter (UART) driver 125 and a direct memory access control (DMAC) driver 126.

The initialization code 121 may be applied to initialize a sub-system of the CPU core. For example, when power is turned on, the sub-system for executing the other code stored in the internal ROM may be initialized by the initialization code 121.

The main initial code 122 may be applied to control a booting sequence of the system after the initialization of the microprocessor. For example, the main initial code 122 may be programmed to determine whether a cable for downloading programs is connected. The main initial code 122 may be programmed to force a monitor program to perform downloading of the programs if the cable for downloading the programs is connected, and to perform booting immediately if the cable for downloading the programs is not connected.

The internal monitor code 123 may have a routine for updating a parallel flash memory device and to perform an initial process of booting the system.

The USB driver 124 may perform USB communications, and the UART driver 125 may perform UART communications. The direct memory access (DMAC) driver 126 may operate with the UART driver 125, thereby improving a speed of transferring data to a target memory.

FIG. 6 is a block diagram illustrating an exemplary implementation of the serial flash memory device 200 shown in FIG. 4.

The serial flash memory device 200 preferably includes a parallel interface (functioning as a host interface 210), for example, a NOR-flash interface. The serial flash memory device 200 includes a host interface 210, a buffer RAM 220, a finite state machine 230, an internal register unit 240, an error correction logic (ECC) unit 250, a NAND flash array 260. The serial flash memory device 200 may additionally include a onetime programmable (OTP) unit 270. In preferred embodiments, the serial flash memory device 200 may be implemented by a OneNAND flash memory, that includes a NAND flash array operatively connected to a parallel (NOR flash) interface.

The host interface 210 may be implemented as a parallel (NOR flash) interface. For example, the host interface 210 may include various pins such as data pins DOG through DQ15, address pins A0 through A15, a clock pin CLK, a chip enable pin /CE, an output enable pin /OE, a write enable pin /WE, a reset pin /RP, an address validity detection pin /AVD and/or an interrupt pin INT.

The buffer RAM 220 may function as an internal random access memory buffer of the serial flash memory device 200, and may include a dedicated boot RAM portion that stores a flash (configuration) table (FCT) and a boot code loader which are stored in the NAND flash array 260 when the power is turned on, and a data RAM portion which functions as a cache memory when data are outputted.

The finite state machine 230 controls the operation of the serial flash memory device 200 after power is turned on. The finite state machine 230 may execute a data loading routine, wherein the data loading routine performs loading (e.g., copying) of a portion of data (e.g., 1 KB stored in block 0) in the NAND flash array 260 including the flash configuration table (FCT) and the boot code loader into the buffer RAM 220 of the serial flash memory device 200 when the power is turned on. The finite state machine 230 may communicate with the NAND flash array 260 by an internal conventional NAND flash interface (not shown). A finite state machine is a device, or a model of a device, which has a finite number of states it can ever be in and can operate on an input to either make a transition from one state to another or to cause an output or action to take place. A finite state machine can only be in one state at any moment in time. A finite state machine (FSM) can be implemented by programmable logic array (PLA), or a programmable microprocessor (it is well known in the art to implement an FSM as a set of instructions for a microprocessor), or by various other digital circuits or mechanical devices.

The internal register unit 240 may include an address register, a command register, a configuration register, a status register and so on.

The error correction (ECC) logic 250 may correct an error block (replacing the error block with a spare block) when the error block occurs in the NAND flash array 260, and check the state of the NAND flash array 260.

The NAND flash array 260 may include a plurality of blocks having the structures of a conventional serial (e.g., NAND) flash memory.

The OTP unit 270 may be programmed only once thereby being available for purposes such as security or product unit identification.

It will be understood that the serial flash memory device 200 may alternatively be implemented by omitting one or more of the elements described above or combining two or more elements described above. In addition it will be also understood that the serial flash memory device 200 may further include other elements having different functions than that of the elements described above. Herein, the serial flash memory device 200 is understood to include fundamentally a memory chip having an external parallel (e.g., NOR-flash) interface and an internal NAND (serial) flash memory. For example, a OneNAND flash memory from Samsung Electronics Co., Ltd. has an external NOR flash (parallel) interface and an internal NAND (serial) flash array.

Figure 7:
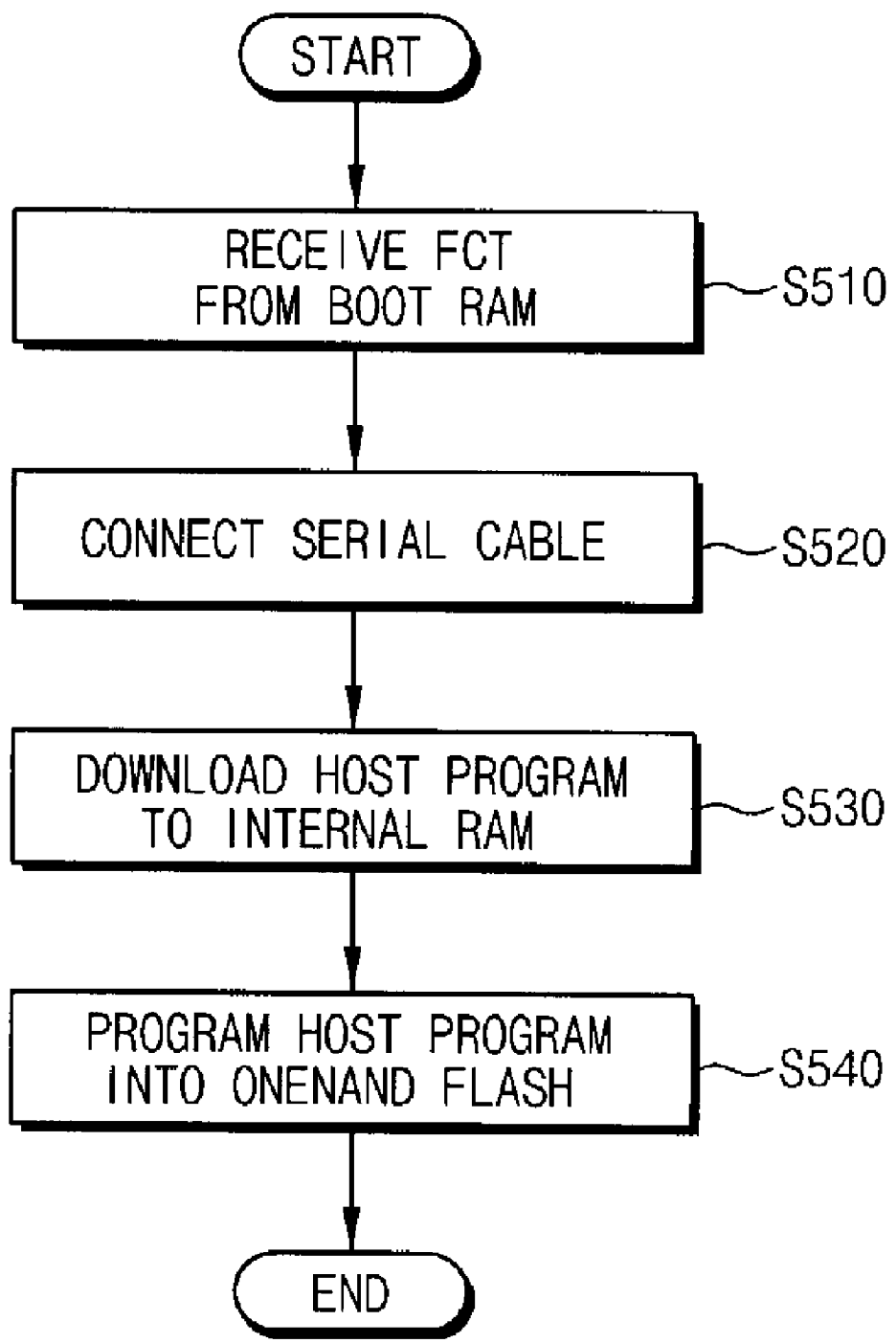
FIG. 7 is a flow chart illustrating a process of updating the serial flash memory device 200 of FIGS. 4 and 6.

FIG. 7 is a flow chart illustrating a process of updating the serial flash memory device 200 of FIGS. 4 and 6.

The microprocessor 100 may receive a flash configuration table (FCT) from the boot RAM 222 in the serial flash memory device 200, according to a routine stored in the microprocessors internal ROM (step S510). When the FCT is determined invalid, code necessary for booting the system, such as application code, boot code and a boot code loader, are not present in the serial flash memory device, and thus the serial flash memory device needs to be initially programmed. Serial cables, such as a special USB cable or a UART cable, are used to initially program and update the serial flash memory device.

The serial cable is connected to the booting system so as to update the serial flash memory device (step S520) and a host download program may be downloaded from a host program provider to the serial flash memory device using the serial cable.

The host download program is downloaded into the internal RAM 130 of the microprocessor 100 through the serial cable (step S530), and the host download program temporarily stored in the internal RAM 130 of the microprocessor 100 is next programmed into the NAND flash array of the serial flash memory device (step S540).

Figure 8:
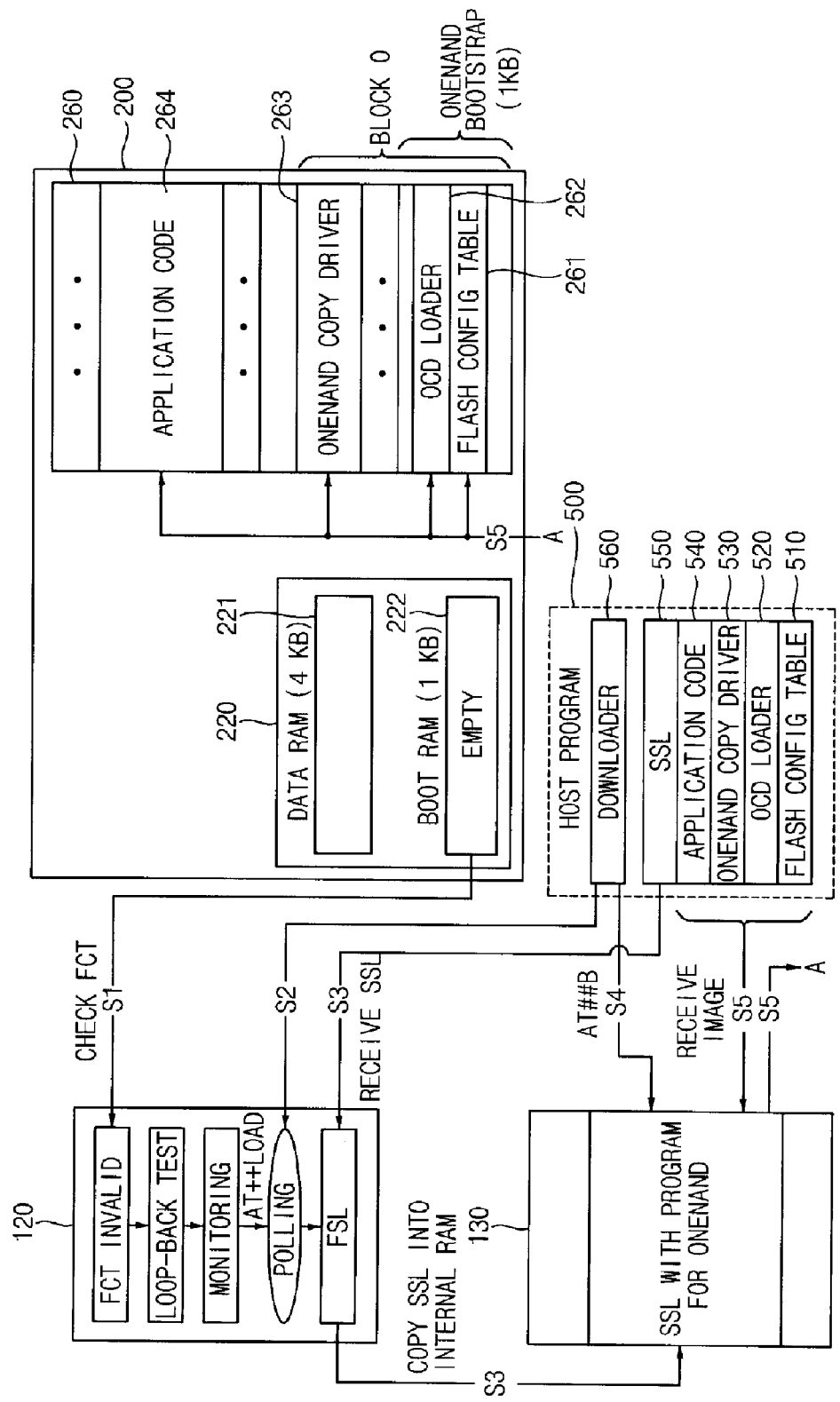
FIG. 8 is a block diagram and memory map illustrating the operation of a booting system for updating the serial flash memory device 200 shown in FIG. 4.

FIG. 8 is a combination flow chart, block diagram and memory map illustrating the operation of a booting system for updating the serial flash memory a device 200 shown in FIG. 4.

The monitor program stored in the internal ROM 120 of the microprocessor 100 is performed to check the flash configuration table (FCT) of the boot RAM 222 in the serial flash memory device 200 (path S1). Since the NAND flash array 260 is empty at the beginning (before initial programming), the FCT is not present in the boot RAM 222 of the serial flash memory device 200. Therefore, the monitor program performs a loop-back test because the FCT is invalid. The loop-back test is a process of checking whether the download cable is connected. When the download cable is connected, the monitor program performs monitoring of whether a specific command indicating the start of the update has been received from the host program provider 500.

When the specific command (AT++LOAD) indicating the start of the update has been received from the host program provider 500 (path S2), the monitor program forces first update code, i.e., a first stage link (FSL), also stored in the internal ROM 120 of the microprocessor 100 to be executed.

The first stage link (FSL) program causes the microprocessor 100 to receive second update code 550, i.e., a second stage link (SSL), from the host program provider 500 over the cable, and copies the SSL into the internal RAM 130 of the microprocessor 100 (path S3). Then, the SSL stored in the internal RAM 130 is executed-in-place (XiP) by the microprocessor 100.

The SSL program waits for a "load" command (AT##B) from the downloader 560. When the SSL receives the "load" command (AT##B) (path S4), the NAND flash array 260 is programmed by downloading application code 540, boot code, i.e., a OneNAND copy driver (OCD) 530, a boot code loader, i.e., an OCD loader 520, and a flash configuration table (FCT) 510 from the host program provider 500 (path S5) and writing that code to the NAND flash array 260.

Figure 9:
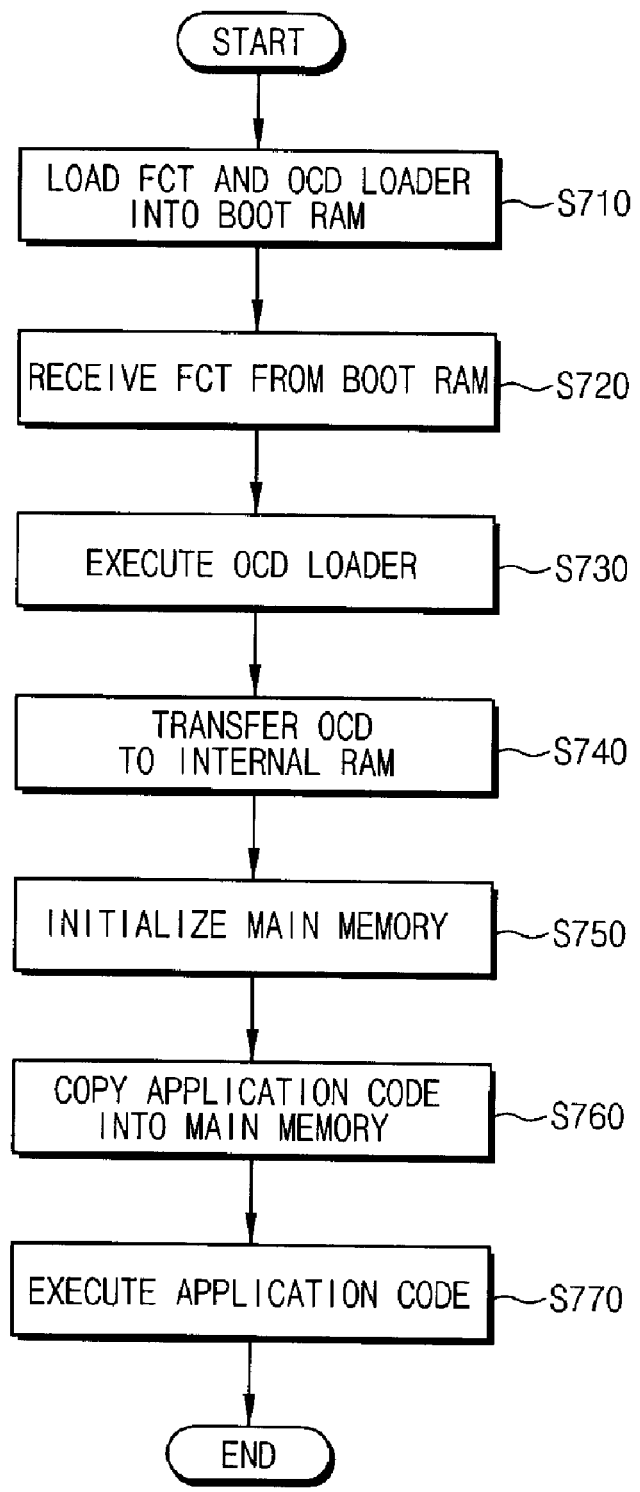
FIG. 9 is a flow chart illustrating a booting process using the serial flash memory device 200 shown in FIG. 4.

FIG. 9 is a flow chart illustrating a booting process using the serial flash memory device 200 shown in FIG. 4.

When the power is turned on (START), the serial flash memory device 200 (shown in FIG. 4) loads the flash configuration table (FCT) and the OCD loader to the buffer RAM (boot RAM) (222 shown in FIG. 8) (step S710). The FCT may provide information necessary for booting the microprocessor 100 using the serial flash memory device 200 shown in FIGS. 4 and 6. For example, the flash configuration table (FCT) may be formed as shown in Table 1.

TABLE 1

Signature Word (4 Bytes)
Flash Table Version (4 Bytes)
Boot Flag and IROM Monitor Delay (4 Bytes)
Application Branch Address (4 Bytes)
OCD Size (4 Bytes)
Reserved (4 Bytes)
Checksum (4 Bytes)

The Boot Flag indicates a flag used for setting a "default" update cable. For example, when the boot flag is set to USB, the USB cable is the default update cable for updating the serial flash memory device and when the boot flag is set to UART, the UART cable is the default update cable for updating the serial flash memory device.

The IROM monitor delay indicates a time period during which the internal ROM monitor program waits in the loop-back test. The loop-back test will be further described as follows. The monitor program running in the microprocessor 100 transfers a string to the update cable assuming that the host program provider is connected through the update cable, and then waits for a predetermined time to check whether the transferred string is received correctly. For example, the monitor program running in the microprocessor 100 transfers a string of "ABC" to the update cable and waits for 100 ms. When the string of "ABC" is received back by the microprocessor 100 through the update cable in 100 ms, the loop-back test is successful.

The application branch address indicates an entry address of the application code in a state capable of execution. The OCD size indicates a size of the boot code OCD.

The main initial program stored in the internal ROM receives the flash configuration table (FCT) from the boot RAM (step S720). After determining that the FCT is valid, when the download cable is not connected, execution jumps from the internal ROM 130 to the OCD loader and the OCD loader is executed by the microprocessor 100 (step S730).

The OCD loader may include a routine for transferring the OCD to the internal RAM 130 of the microprocessor 100 (step S740). The OCD loader is necessary for the following reasons. The OCD may include a routine for initializing the main memory 300 used by the microprocessor 100, a routine for loading (e.g., copying) the application code into the main memory 300, an application routine for managing other NAND blocks, and so on. A large-sized application may not be serially (contiguously) arranged in the serial flash memory device. In other words, the application having a size that is larger than that of one block may be dispersed (fragmented) in the serial flash memory, so that the OCD may include a routine for serially gathering the dispersed (fragmented) programs to transfer the gathered programs to the main memory 300 in executable form. In addition, the OCD may include a routine for checking the error block, a routine for checking a validity of the application code and/or a routine for checking a security code. Therefore, the size of the OCD may be larger than that of the boot RAM 222. In this case, the OCD is not loaded into the boot RAM 222, but rather is loaded into the internal RAM 120 or the main memory 300 so that the OCD may directly perform the booting process. Thus, an OCD loader is necessary for transferring the COD to a sufficiently large storage device capable of random access, such as for example, the internal RAM 120 or the main memory 300 of the microprocessor 100.

The OCD loader transferring the OCD to the internal RAM 130 or main memory 300 does not require a routine for initializing the internal RAM 130 or main memory 300, so that the size of the OCD loader may be small sufficient to be loaded into the boot RAM. The OCD is executed after being transferred to the internal RAM 130 or the main memory 300 of the microprocessor 100.

If the OCD has been transferred to the internal RAM 130 and is executed in place there, the COD initializes the main memory 300 (step S750) and then copies the application code into the main memory (step S760). The application code may include the OS program and various application programs.

When the application code is copied into the main memory, execution jumps from the OCD to the application code (step S770).

Figure 10:
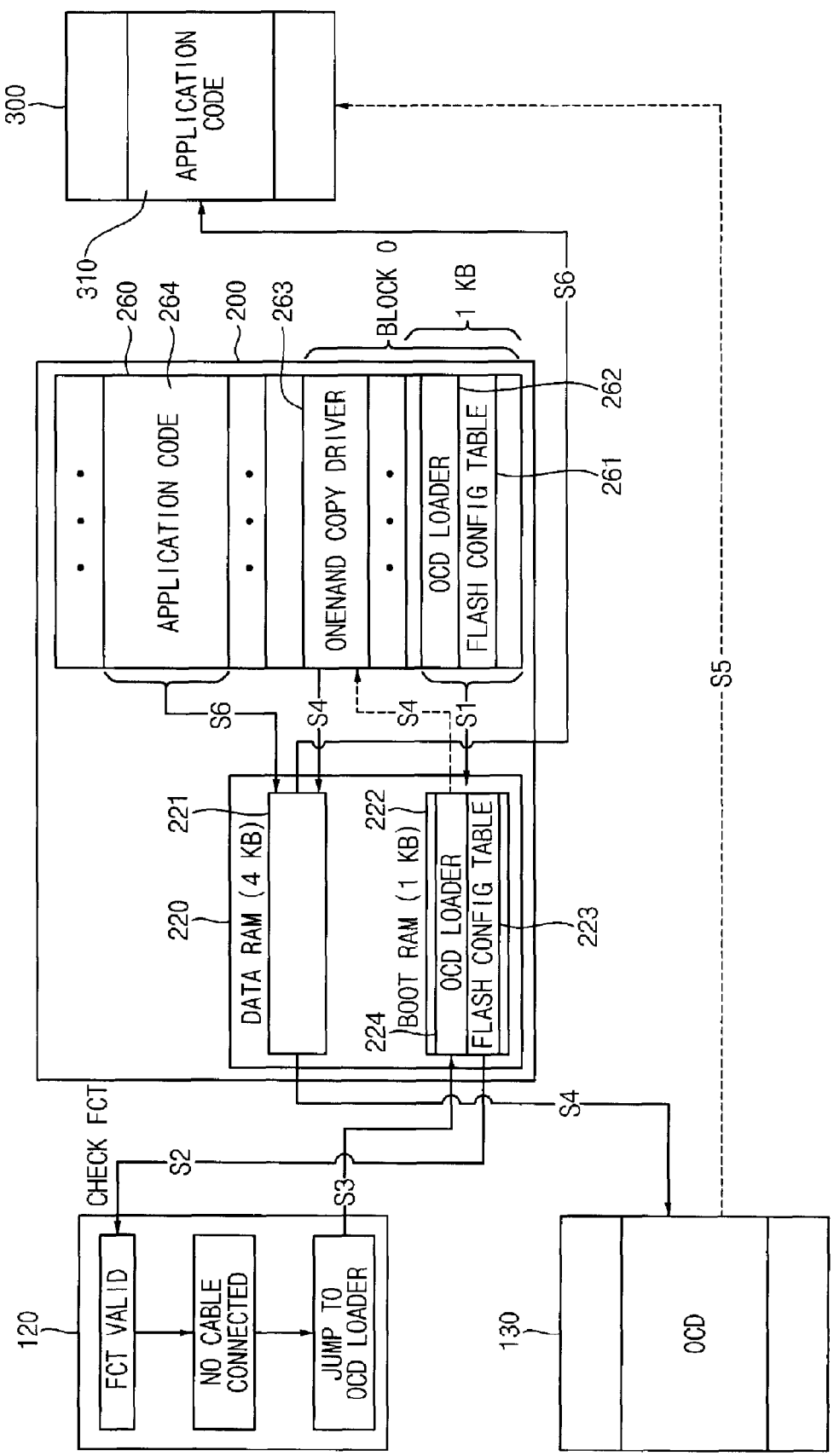
FIG. 10 is a combination flow chart, block diagram and memory map illustrating the operation of an alternative booting system using the serial flash memory device 200 shown in FIG. 4.

FIG. 10 is a combination flow chart, block diagram and memory map illustrating the operation of an alternative booting system using the serial flash memory device 200 shown in FIG. 4.

When the power to the serial flash memory device 200 is turned on, the serial flash memory device 200 loads 1 KB of data stored in the NAND flash array 260 into its boot RAM 222 (path S1). The 1 KB of data may include the flash configuration table (FCT) 261 and the OCD loader 262 stored in the NAND flash array 260. Then, a main initial program stored in the internal ROM 120 is executed to check the validity of the FCT 223 loaded in the boot RAM 222 in the serial flash memory device 200 (path S2). As a result of checking the FCT, when the update cable not connected, the monitor program execution jumps to an address of the OCD loader 224 loaded in the Boot RAM 222 of the serial flash memory device 200, so as to execute (e.g., execute in place) the OCD loader loaded into the boot RAM 222 (path S3).

The OCD loader 224 loads (copies) the COD 263 stored in the NAND flash array 260 into the internal RAM 130 of the microprocessor 100 (path S4). The OCD 263 is transferred (copied) to the internal RAM 130 of the microprocessor 100 out of the NAND flash array 260 of the serial flash memory device 200 through the data RAM 221 (path S4). After transferring (copying) the OCD 263 to the internal RAM 130 of the microprocessor 100, execution jumps from the OCD loader 224 to the OCD 263 loaded into the internal RAM 130.

The OCD 263 initializes the main memory 300 (path S5). Then, the OCD 263 transfers (copies) the application code 264 stored in the NAND flash array 260 to the main memory 300. The application code 264 is transferred (copied) to the main memory 300 out of the serial flash memory device 200 through the data RAM 221. After transferring (copying) the application code 264 to the main memory 300, the OCD 263 execution jumps to the application code 310 loaded in the main memory 300.

Figure 11:
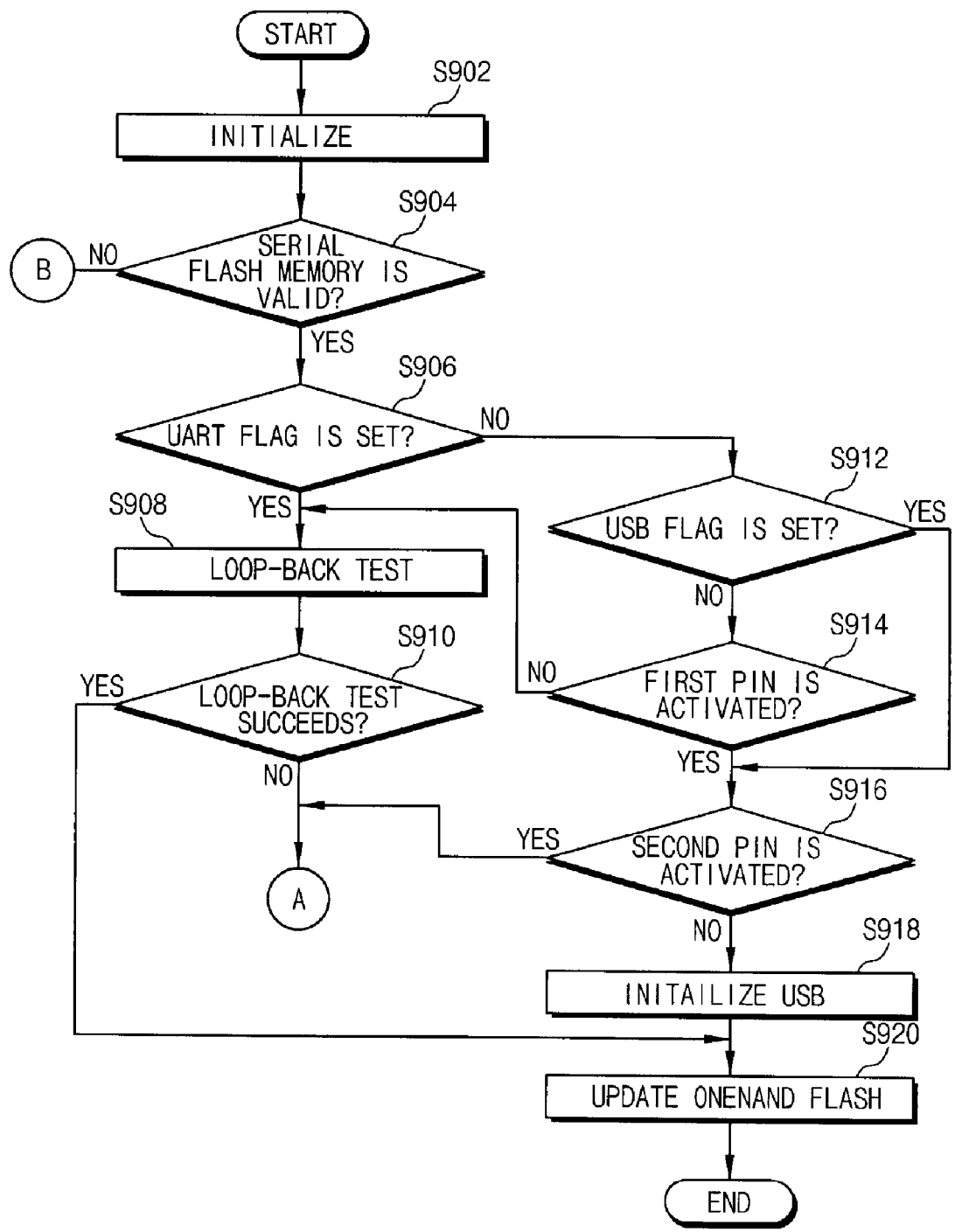
FIGS. 11, 12 and 13 are a flow chart illustrating process of booting and updating for a booting system according to an exemplary embodiment of the present invention.
Figure 12:
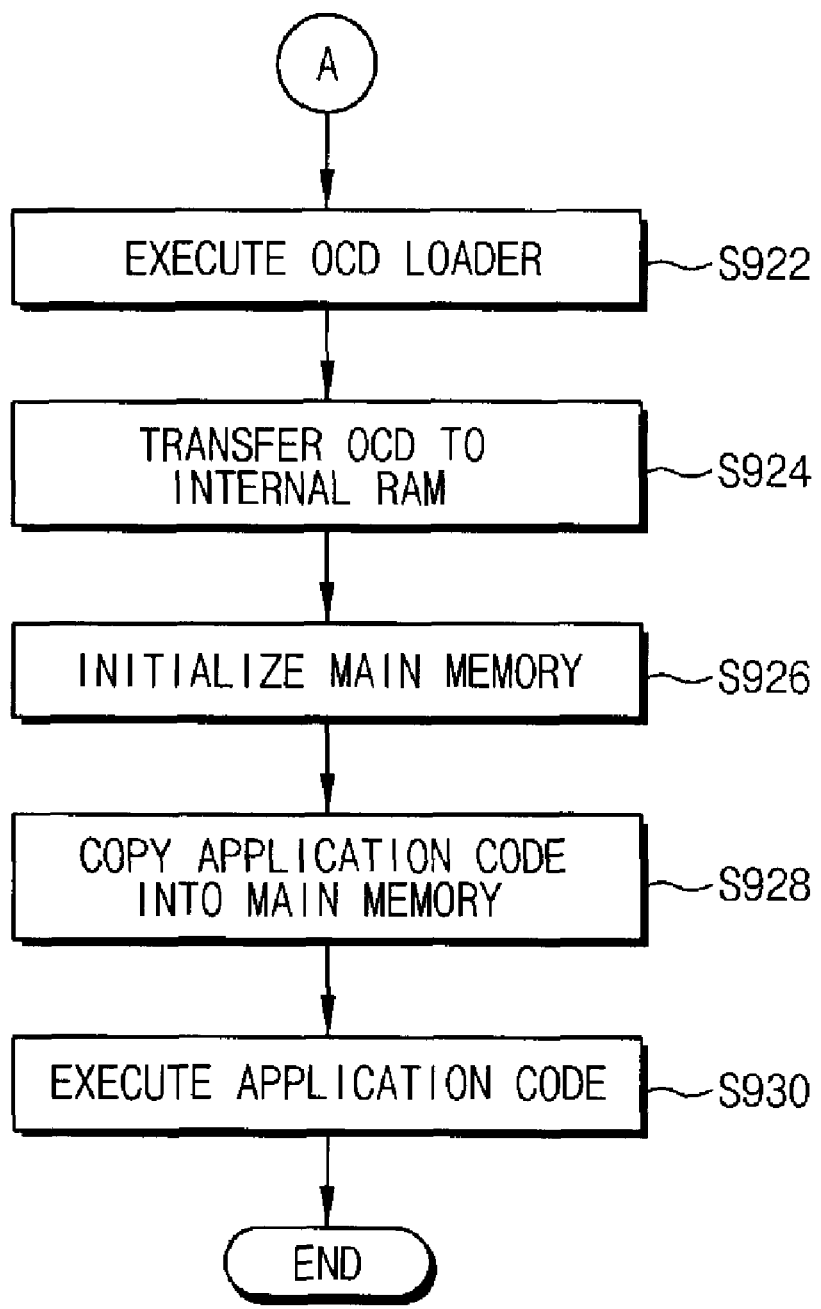
Figure 13:
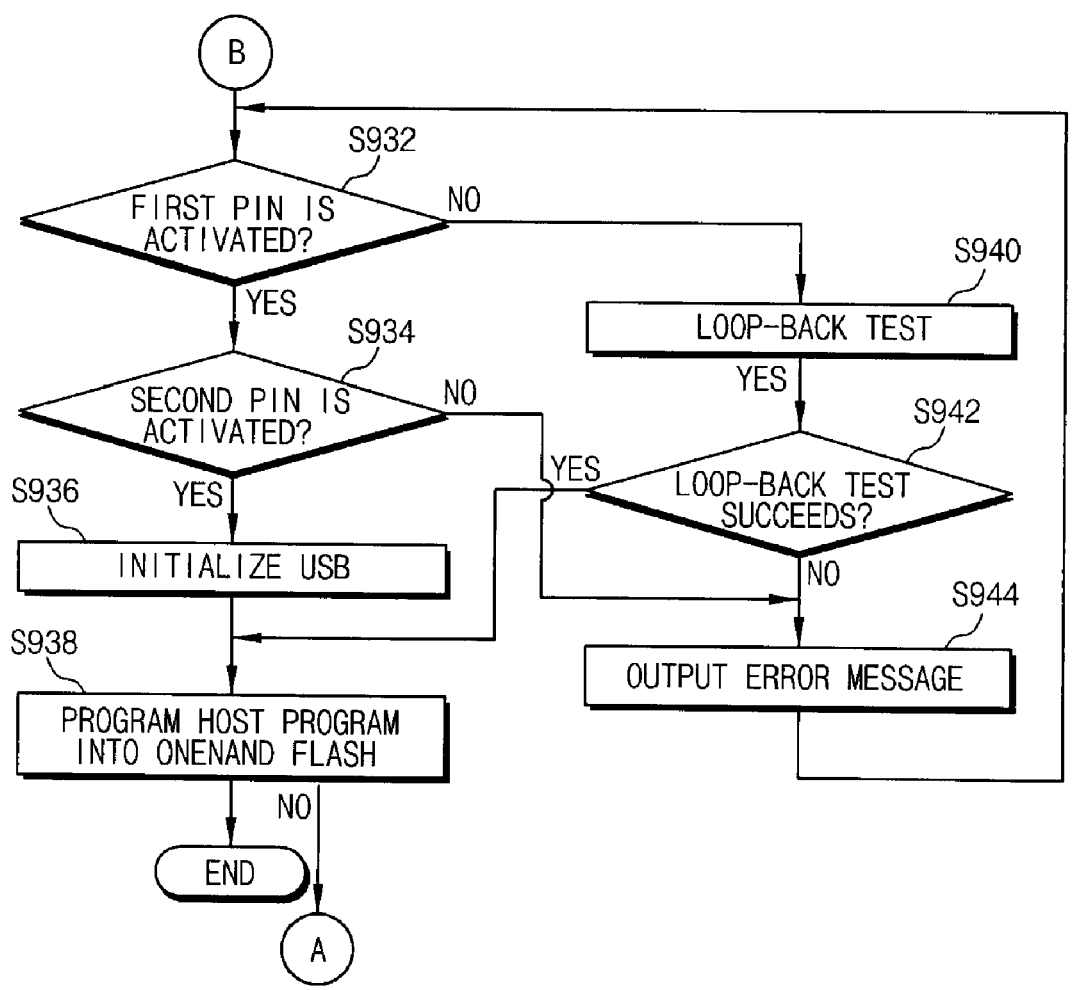

FIGS. 11, 12 and 13 are a flow chart illustrating a process of booting and updating for a booting system according to an exemplary embodiment of the present invention. The operation of updating the booting system will be described by using the UART or the USB. However, the description is merely illustrative of the present invention, and the operation of updating the booting system may also be performed by using other methods, such as by random access of the NAND flash array 260 through the microprocessor executing an application, or an operating system upgrade program, or a "system backup" file, or a "system restore" file, or system "hibernation" file, or an executable file uploaded by a remote ("network administrator") user.

Referring to FIG. 11, when the power is turned on, the booting system is initialized (step S902). For example, the microprocessor is initialized according to the value of a basic SOC stored in the internal ROM 120 of the microprocessor 100, and some executable code of the NAND flash array 260 in the serial flash memory device 200 is loaded into the boot RAM 222 of the serial flash memory device 200.

After initializing the booting system, the main initial program stored in the internal ROM 120 of the microprocessor 100 checks whether the flash configuration table (FCT) (or executable code) copied in the boot RAM 222 of the serial flash memory device 200 is valid by checking the FCT (step S904). When the flash configuration table (FCT) (or executable code) copied in the boot RAM 222 of the serial flash memory device 200 is invalid, operations of initial downloading or updating with respect to the serial flash memory device 200 are performed and will be described with reference to FIG. 13. When the flash configuration table (FCT) (or executable code) copied in the boot RAM 222 of the serial flash memory device 200 is valid, the state of the UART flag (whether set "YES" or not set "NO") in the FCT is determined (step S906). When the UART flag is set (branch "YES" of decision step S906), the UART cable is the default update cable.

When the UART flag is set (branch "YES" of decision step S906), the loop-back test is executed (step S908), and whether the loop-back test succeeds or fails is determined (step S910). When the loop-back test succeeds (branch "YES" of decision step S910), initial downloading or updating for the serial flash memory device 200, (e.g. the OneNAND flash), is performed (step S920). When the loop-back test does not succeed (branch "NO" of decision step S910), updating is not performed, so that a general process (A, see FIG. 12) of booting the microprocessor system is performed. (The process of booting the microprocessor system will be described with reference to FIG. 12.)

On the other hand, when the UART flag is not set (branch "NO" of decision step S904), the state of the USB flag (whether set or not set) is determined (step S912). When the USB flag is set (branch "YES" of decision step S912), the USB cable is the default update cable. If the USB flag is set (branch "YES" of decision step S912), whether or not a second pin is activated is determined (decision step S916). The second pin indicates whether the USB cable corresponds to the update cable or a normal cable. When the second pin is activated (branch "YES" of decision step S916), the connected USB cable is a normal USB cable, so that the process of booting the system shown in FIG. 12 is immediately performed without updating the serial flash memory device 200. When the second pin is not activated (branch "NO" of decision step S916), an initialization or boot-up according to a USB standard is performed (step S918). After the initialization, or boot up, according to the USB standard, the serial flash memory device, (e.g., the OneNAND flash), may be updated (step S920).

When the USB flag is not set (branch "NO" of decision step S912), the default update cable is not determined, so that the state of a first pin (whether or not it is activated) is determined (decision step S914). The first pin indicates whether the USB cable is connected. When the first pin is activated (branch "YES" of decision step S914), the USB cable is connected, so that the next steps including step S916 are performed as shown in FIG. 11.

When the first pin is not activated (branch "NO" of decision step S914), the USB cable is not connected, and the loop-back test is performed (step S908). Then, the steps following from step S910 are performed.

Referring to FIG. 12, the monitor program executes the OCD loader that has been loaded (copied) into the boot RAM 222 for booting the system (step S922). The OCD loader transfers (copies) the OCD to the internal RAM 222 (step S924) for execution in place. Then, the OCD transferred to the internal RAM 222 is executed.

Firstly, the GOD initializes the main memory 300 (step S926). When the main memory 300 is initialized, the OCD copies the application code stored in the NAND flash array 260 in the serial flash memory device 200 into the main memory 300 (step S928). When the application code is copied into the main memory, the OCD execution jumps to the application code copied in the main memory (step S930).

Referring to FIG. 13, when the flash configuration table (FCT) (or executable code) copied in the boot RAM 222 of the serial flash memory device 200 is invalid, the monitor program checks a state of the first pin, to determine whether the first pin is activated (step S932). When the first pin is activated (branch "YES" of decision step S932), the USB cable is connected, so that whether or not the second pin is activated is determined (decision step S934). When the second pin is activated (branch "YES" of decision step S934), the connected USB cable is the update cable, and so the USB is initialized (step S936), and the host program of the host program provider is programmed into the serial flash memory device 200, (e.g., the OneNAND flash) (step S938). When the second pin is not activated (branch "NO" of decision step S934), the connected USB cable is not the update cable, and so an error message is output (step S944) and the steps following from step S932 are performed again.

When the first pin is not activated (branch "NO" of decision step S932), the loop-back test is performed (step S940) so as to determine whether the UART cable operates properly. Then, whether the loop-back test succeeded or failed is determined (step S942). If the loop-back test succeeded (branch "YES" of decision step S942), the host program of the host program provider is programmed into the serial flash memory device 200, (e.g., the OneNAND flash) (step S938). If the loop-back test has failed (branch "NO" of decision step S942), the error message is output (step S944) and step S932 is performed again.

In a case where the size of the boot RAM 222 or the buffer RAM 220 of the serial flash memory device is not sufficiently large, booting the microprocessor system is performed as described above. However, when the serial flash memory device 200 includes a sufficiently large, boot RAM 222, the OCD loader may be unnecessary.

The booting of a microprocessor system from a serial flash memory device 200 including a sufficiently large boot RAM 222 (obviating a OCD loader) will be described with reference to FIGS. 14 and 15.

Figure 14:
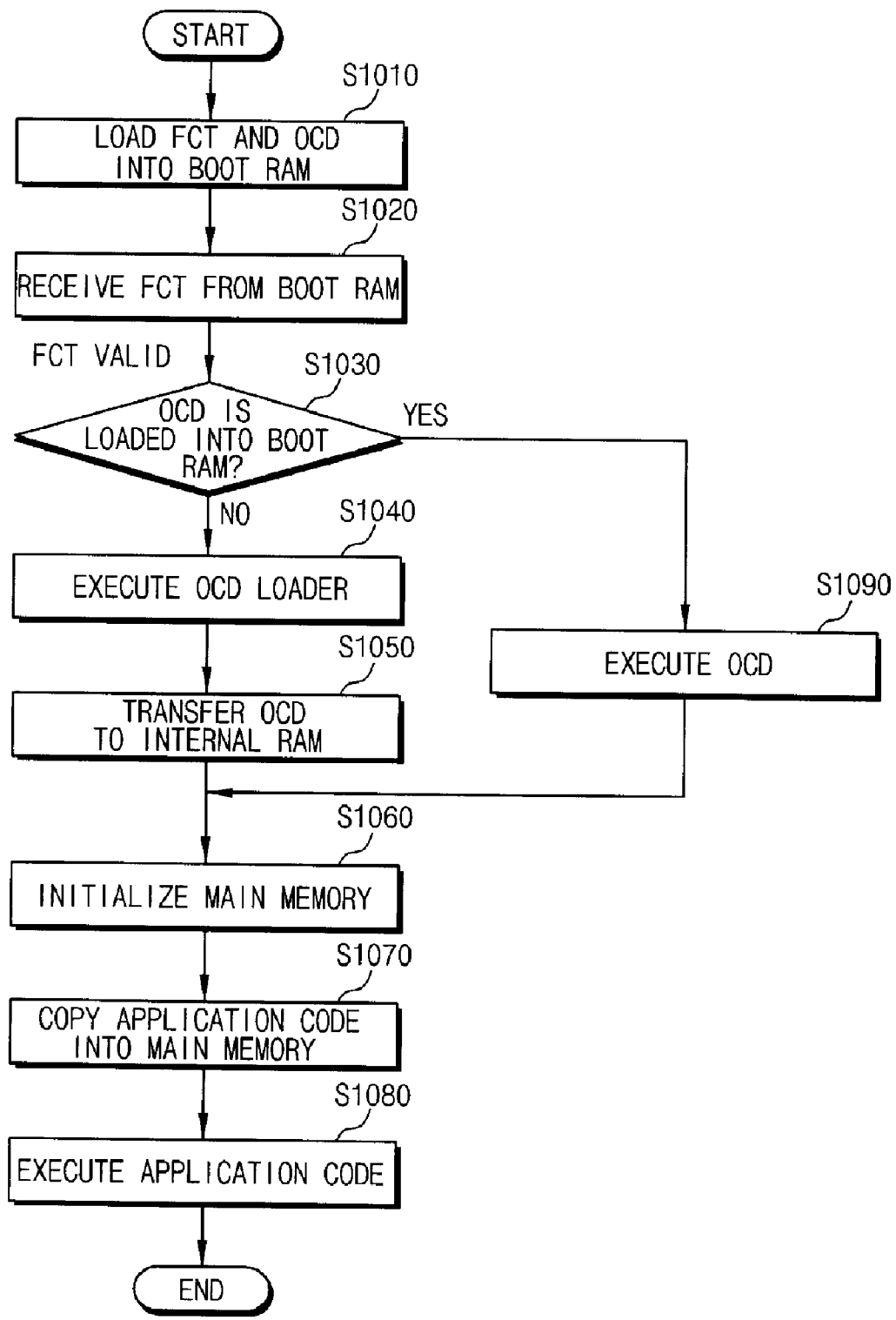
FIG. 14 is a flow chart illustrating a booting process using the serial flash memory device 200 in FIG. 4 including a sufficiently large boot RAM 226.

FIG. 14 is a flow chart illustrating a booting process using a serial flash memory device 200 in FIG. 4 including a sufficiently large boot RAM 222.

When power is turned on, a serial flash memory device 200 (FIG. 4) including a sufficiently large boot RAM (226 in FIG. 15), e.g., 16 Kbytes, performs loading (copying) of a flash configuration table (FCT) (227 in FIG. 15) and of boot code (GOD) (228 in FIG. 15) from into the boot RAM 226 in the serial flash memory device 200 (step S1010). The FCT is a flash configuration table that provides information necessary for executing the booting system using the serial flash memory device 200, plus a checksum for determining its validity.

The main initial program stored in the internal ROM 120 of the microprocessor 100 receives the FCT from the boot RAM 222 of the serial flash memory device 200 (step S1020). When the FCT is valid, whether or not the OCD is to be loaded into the boot RAM 222 is determined (step S1030). A monitor program decides whether the executable code (OCD) is to be loaded into the boot RAM 222 based upon the size of the executable boot code (OCD). For example, in a case where the size of the boot RAM 222 is 16 KB (e.g., boot RAM 226 in FIG. 15) and the size of the OCD is smaller (e.g., 10 KB), the OCD may be immediately and entirely loaded into the boot RAM 222 for execution in place (XiP).

When the OCD is loaded into the boot RAM 222, the monitor program execution jumps to the OCD loaded into the boot RAM 222 (step S1090). The OCD initializes a main memory 300 (step S1060) and copies application code (stored in the NAND flash array 260) into the main memory 300 (step S1070). Then, the OCD execution jumps to the application code (step S1080).

On the other hand, when the OCD is not loaded into the boot RAM 222, the OCD loader is loaded into the boot RAM 222, so that the main initial program executes-in-place the OCD loader in the boot RAM 222 (step S1040). Then, the OCD loader transfers (copies) the OCD to the internal RAM 120 in the microprocessor 100 (step S1050) and executes the OCD. The OCD initializes the main memory 300 (step S1060) and then copies the application code into the main memory 300 (step S1070). Then, the OCD execution jumps to the application code (step S1080).

Figure 15:
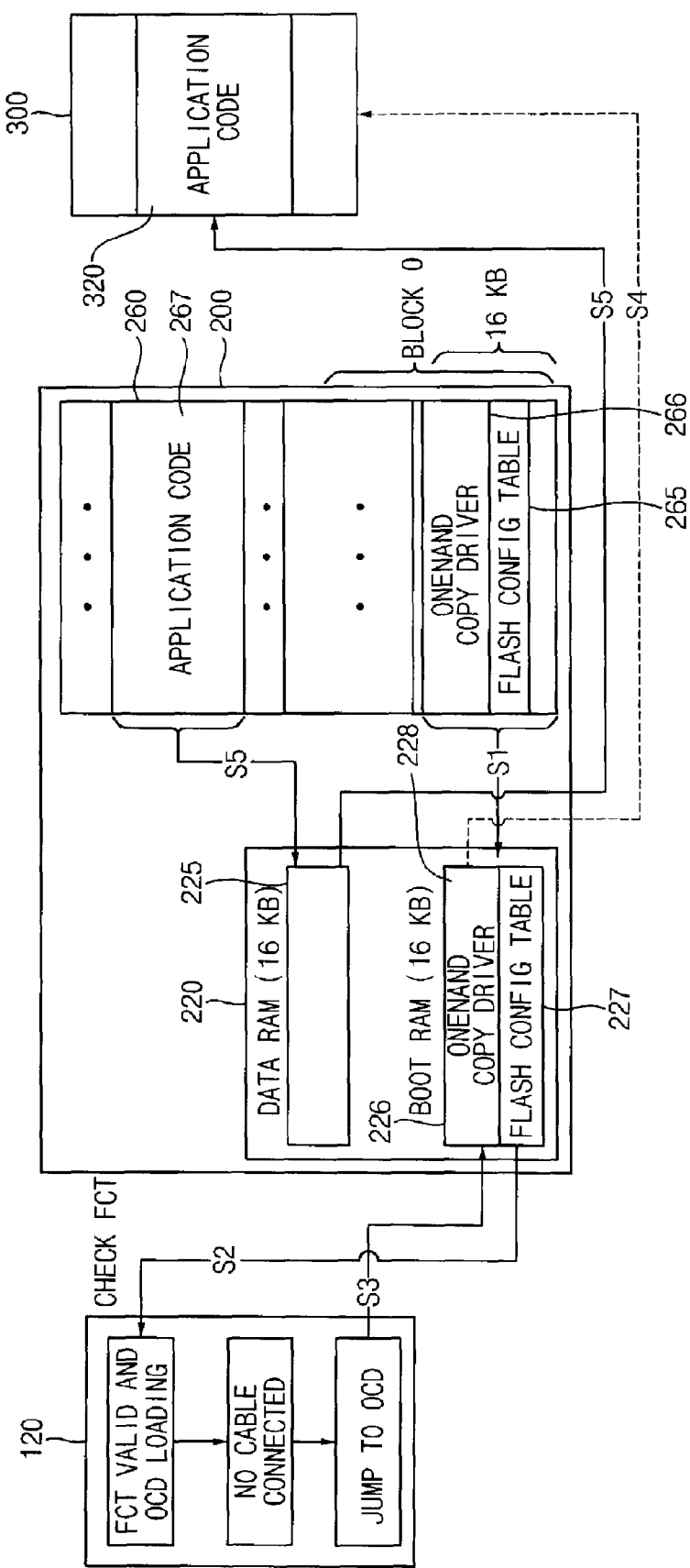
FIG. 15 is a combination flow chart, block diagram and memory map illustrating the operation of an alternative process of booting a microprocessor system using the serial flash memory device 200 shown in FIG. 4 including a sufficiently large boot RAM 226.

FIG. 15 is a combination flow chart, block diagram and memory map illustrating an alternative process of booting a microprocessor system using the serial flash memory device 200 shown in FIG. 4 including a sufficiently large boot RAM 226.

When the power is turned on, the serial flash memory device 200 loads (copies) the flash configuration table (FCT) 261 and executable boot code 266 stored in the NAND flash array 260 into the boot RAM 226 (path S1). The (16 KB of) executable boot code OCD 228 (266) and the FCT 227 (265) may have a size equal to or less than the size of the boot RAM 226 (e.g., 16 KB). Then, the monitor program in the internal ROM 120 of the microprocessor 100 checks of the validity of the FCT 227 loaded (copied) into the boot RAM 226 in the serial flash memory device 200 (path S2). As a result of checking the FCT, when the update cable is not connected, the execution of the monitor program performs jumping (jumps) to an address of the executable boot code OCD 228, so as to execute-in-place the OCD in the boot RAM 226 (path S3).

The OCD 228 initializes the main memory 300 (path S4). Then, the OCD transfers (copies) the application code 267 stored in the NAND flash array 260 to the main memory 300 (path S5).

The booting system in FIG. 15 includes the boot RAM 226 having a size sufficiently large with respect to the size of the flash configuration table (FCT) 261 and executable boot code 266 stored in the NAND flash array 260, so that the OCD may be directly loaded and executed in place in the boot RAM 226.

Figure 16:
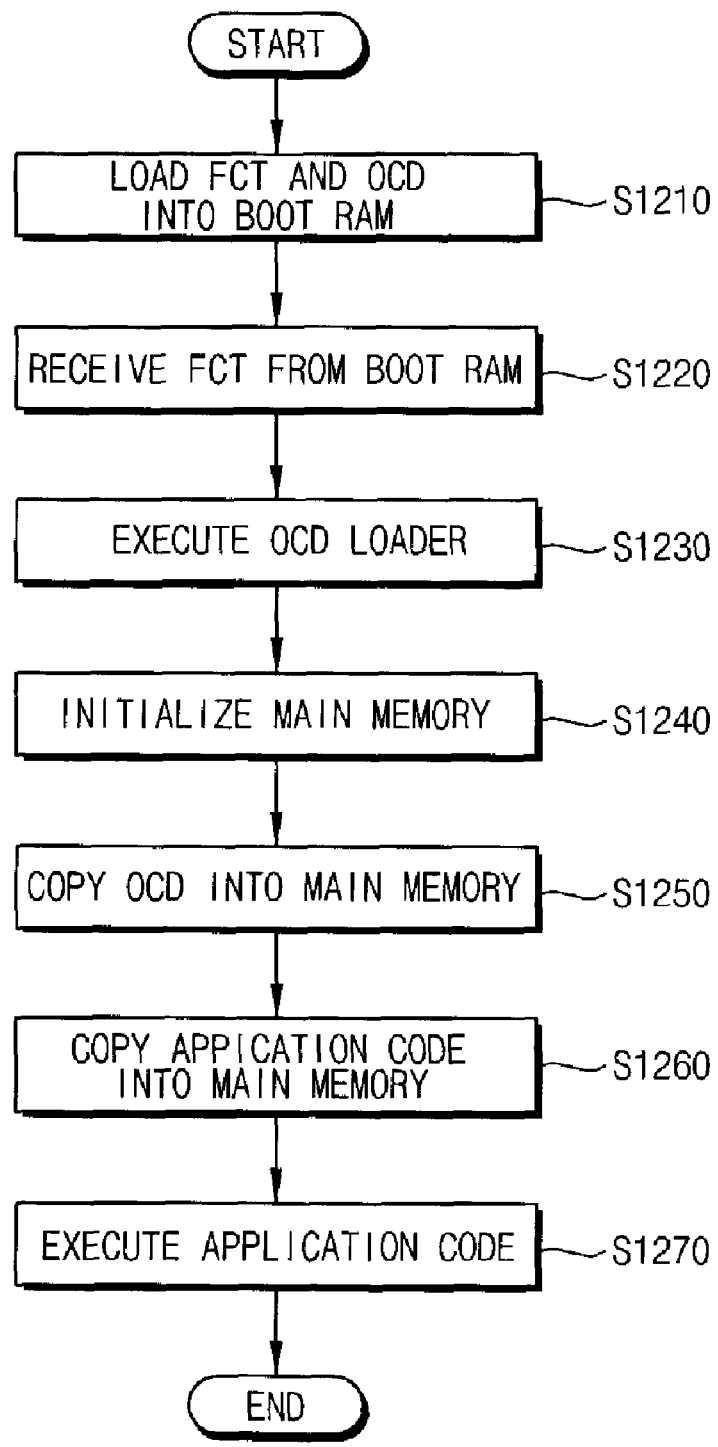
FIG. 16 is a flow chart illustrating an alternative booting process using the serial flash memory device 200 of FIG. 4 according to an exemplary embodiment of the present invention.

FIG. 16 is a flow chart illustrating an alternative booting process using the serial flash memory device 200 of FIG. 4.

Figure 1:
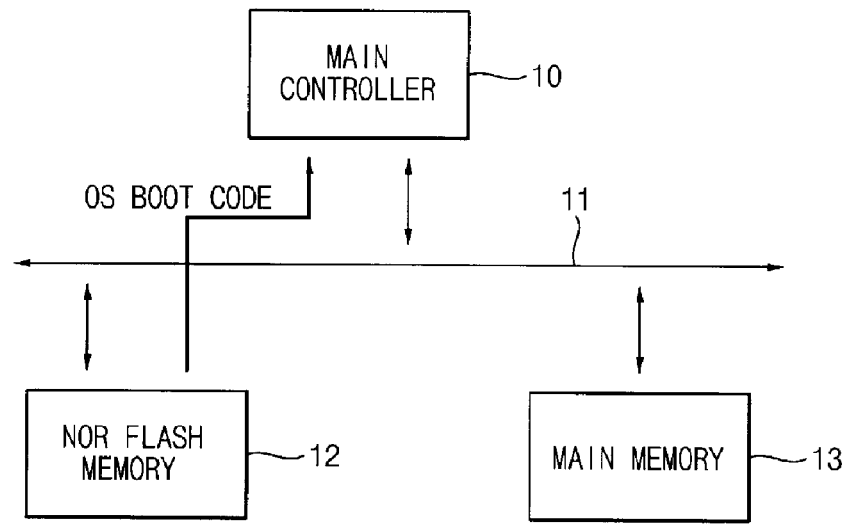
FIGS. 1, 2 and 3 are block diagrams illustrating conventional booting systems.
Figure 2:
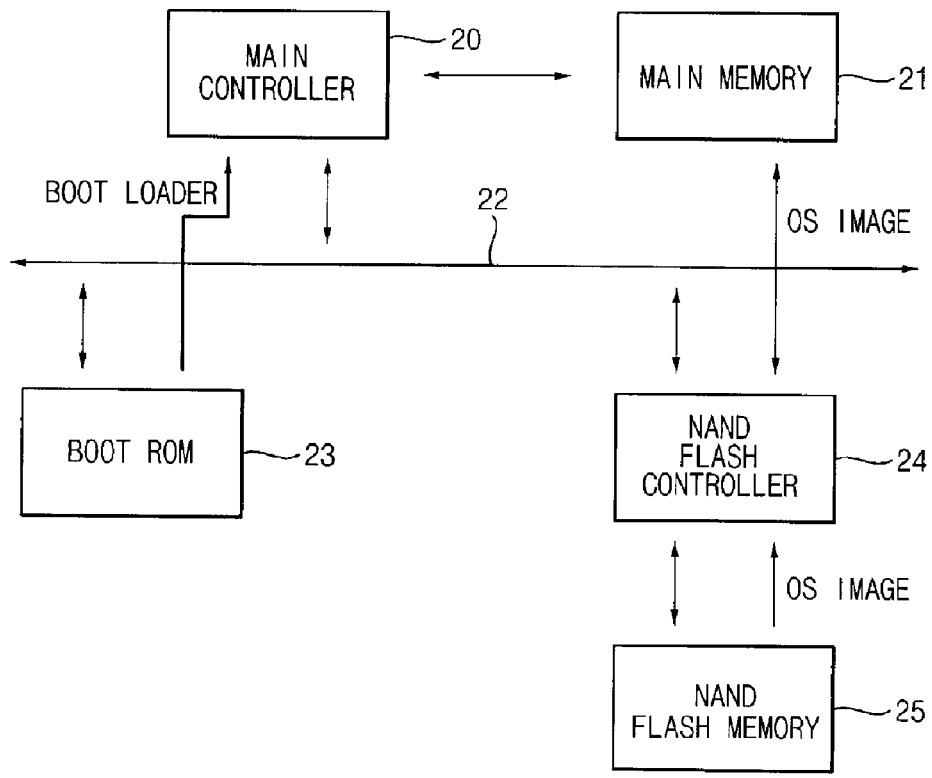

When power is turned on, the serial flash memory device 200 of FIG. 4 loads of a flash configuration table (FCT) and an executable boot code (OCD) loader into a buffer RAM 220 (FIG. 6, or FIG. 17), such as portion reserved for a boot RAM (222 in FIG. 6 or FIG. 17) (step S1210). The FCT provides information necessary for executing the booting system using the serial flash memory device 200. For example, the FCT may be structured as shown in FIG. 1. It will be understood by persons skilled in the art that the FCT may have various other and different data structures and contents.

A monitor program in an internal ROM 120 of the microprocessor 100 (FIG. 4) receives the FCT from the boot RAM 222 (step S1220). When the FCT is valid, the monitor program performs booting process.

The monitor program executes the OCD loader in the internal RAM (step S1230). The OCD loader may include a routine for initializing the main memory 300, and a routine for loading (e.g., copying) the OCD into the main memory 300.

When the OCD loader is implemented so as to include the routine for initializing the main memory 300 and the routine for loading (e.g., copying) the OCD into the main memory 300, the size of the OCD loader may be larger than that of the OCD loader in FIGS. 7 and 8. However, in a case where the OCD loader may be loaded into the boot RAM, and includes the routine for initializing the main memory 300 and the routine for loading (e.g., copying) the GOD into the main memory 300, the booting operation according to the following exemplary embodiment of the present invention may be performed.

The OCD loader initializes the main memory 300 (step S1240) and then, copies the executable boot code OCD (263) into the main memory 300 (step S1250). The OCD may include a routine for loading (e.g., copying) the application code 264 into the main memory 300. As described above, the executable boot code OCD 263 may include various routines that copy application code 264 of large size into the main memory 300. After loading (e.g., copying) the executable boot code OCD 263 into the main memory 300, the executable boot code GOD is executed-in-place in the main memory 300.

The OCD loads (copies) the stored application code 264 into the main memory 300 (step S1260). The stored application code 264 may include part or all of an operating system (OS) program and various application programs.

When the stored application code 264 is copied into the main memory 300, the application code is executed-in-place in the main memory 300 (step S1270).

Figure 17:
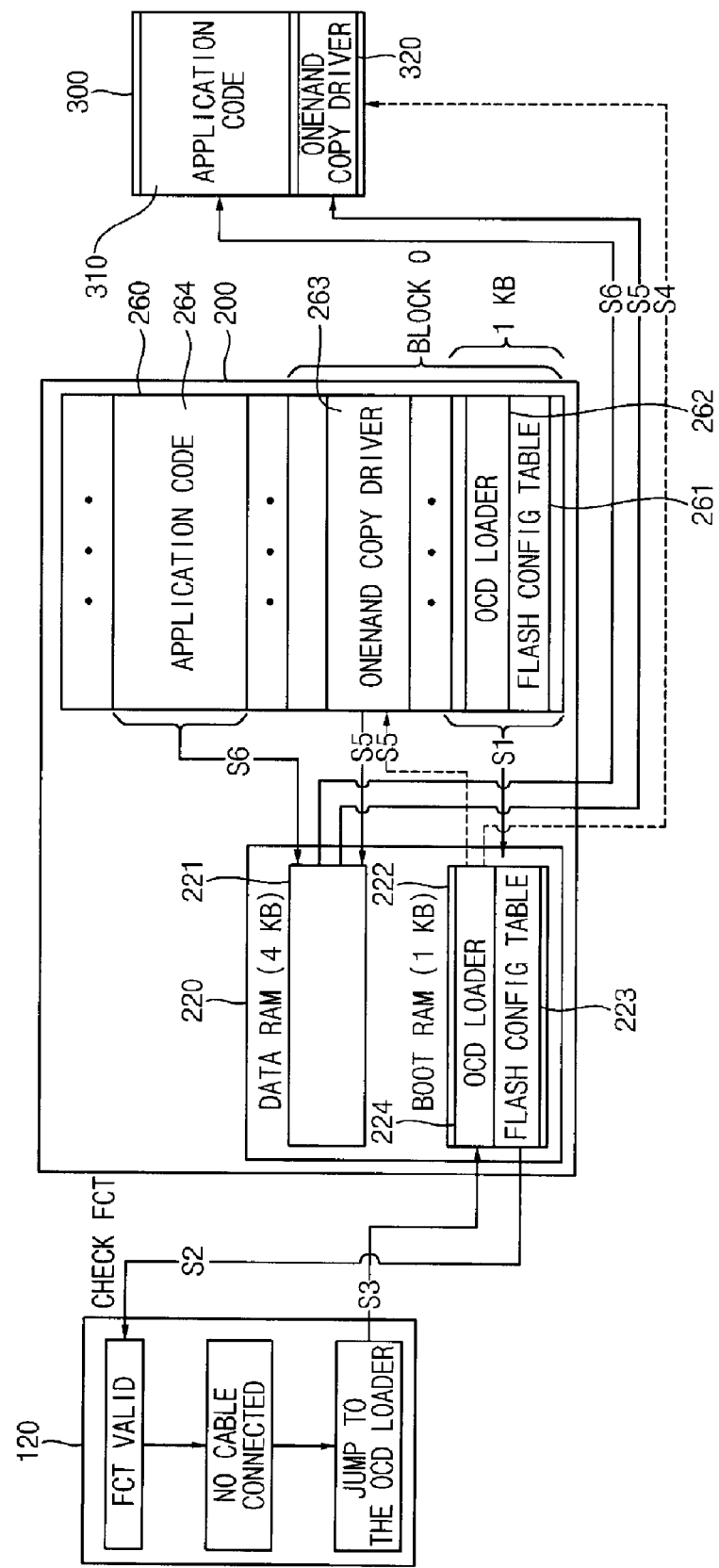
FIG. 17 is a combination flow chart, block diagram and memory map illustrating the operation of a booting system according to an exemplary embodiment of the present invention.

FIG. 17 is a combination flow chart, block diagram and memory map illustrating an alternate process of booting a microprocessor system using the serial flash memory device 200 shown in FIG. 4.

When the power is turned on, the serial flash memory device 200 loads of 1 KB of data stored in the NAND flash array 260 into the boot RAM 222 (path S1). The 1 KB of stored data may include the flash configuration table (FCT) 261 and the executable boot code (OCD) loader 262. Then, the monitor program in the internal ROM 120 of the microprocessor checks the validity of the copied FCT 223 in the boot RAM 222 in the serial flash memory device 200 (path S2). As a result of checking the copied FCT 223, when the update cable is not connected, the monitor program execution performs jumping (jumps) to an address of the executable boot code (OCD) loader 224, so as to execute-in-place the OCD loader loaded (copied) in the boot RAM 222 (path S3).

The GOD loader 224 initializes the main memory 300 (path S4). Then, the COD loader 224 transfers (copies) the OCD 263 to the main memory 300 (path S5). The GOD 263 is transferred (copied) to the main memory 300 through the data RAM 221. The OCD 320 transferred (copied) to the main memory 300 is executed and the OCD transfers (copies) the stored application code 264 to the main memory 300. The application code 264 is transferred (copied) to the main memory 300 through the data RAM 221 (path S6). After transferring (copying) the application code 264 to the main memory 300, the OCD executes the application code 310 loaded in the main memory 300.

As described above, the method of booting a system according to exemplary embodiments of the present invention may boot a microprocessor system, at low costs, while ensuring the flexibility of a microprocessor including a ROM, by using NAND flash memory having a random-access (parallel, "NOR" flash) interface.

The method of booting the microprocessor system according to an exemplary embodiment of the present invention may boot the system, even though a size of the RAM memory buffer of the NAND flash memory device having the random-access (parallel) interface is small, while storing executable boot code (and/or a boot code loader having a routine for transferring the boot code to the internal memory of the microprocessor), in the NAND flash memory device having the random-access interface.

What is claimed is:

1. A method of booting a microprocessor system using a flash memory device having a serial flash memory array and a RAM buffer having a random-access interface, comprising:
loading a boot code loader stored in the serial flash memory array into the RAM buffer when power is turned on;
executing a routine stored in a read-only memory (ROM) of a microprocessor, the executing comprising:
executing the boot code loader to load boot code stored in the serial flash memory array into an internal RAM in the microprocessor;
loading application code stored in the serial flash memory array into a main memory according to the boot code; and
executing the application code.

2. The method of claim 1, wherein the ROM is an internal ROM in the microprocessor.

3. The method of claim 1, wherein executing the routine stored in the read-only memory (ROM) of the microprocessor comprises:
determining whether or not a cable for updating the boot code stored in the serial flash memory array is connected; and
executing the boot code loader loaded in the RAM buffer if the cable is not connected.

4. The method of claim 3, wherein executing the routine stored in the read-only memory (ROM) of the microprocessor further comprises updating contents of the serial flash memory array when the cable is connected.

5. The method of claim 3, wherein executing the boot code loader further comprises receiving configuration information in a flash configuration table (FCT) loaded into the RAM buffer when the power is turned on, prior to determining whether the cable is connected.

6. The method of claim 1, wherein loading of the application code into the main memory comprises:
initializing the main memory; and
loading the application code into the main memory.

7. A microprocessor system comprising:
a microprocessor including an internal ROM storing first code executable by the microprocessor and an internal RAM;
a main memory; and
a flash memory device comprising:
a serial flash memory array storing second code executable by the microprocessor;
a RAM buffer having a random-access interface; and
a finite state machine configured to load the second code into a first predetermined location in the RAM buffer when power is turned on,
wherein a routine of the first code loaded from the internal ROM controls the microprocessor to execute the second code in the RAM buffer, the second code being a boot code loader.

8. The system of claim 7, wherein the serial flash memory array additionally stores third code and fourth code executable by the microprocessor.

9. The system of claim 8, wherein the microprocessor loads the third code into the internal RAM according to a routine of the second code executed in the RAM buffer, loads the fourth code into the main memory according to a routine of the third code executed in the internal RAM, and then executes the fourth code in the main memory.

10. The system of claim 9, wherein the third code is boot code, and the fourth code is application code.

11. The system of claim 10, wherein the routine of the first code loaded from the internal ROM comprises:
a first determination procedure for determining whether a cable for updating contents of the serial flash memory array is connected; and
a procedure that jumps execution to the boot code loader loaded in the RAM buffer when the cable is not connected.

12. The system of claim 11, wherein the routine of the first code loaded from the internal ROM further comprises an updating procedure that updates the contents of the serial flash memory array when the cable is connected.

13. The system of claim 10, wherein the routine of the second code comprises:
an initializing procedure that initializes the main memory; and
a loading procedure that loads the application code stored in the serial flash memory array into the main memory.

14. The system of claim 7, wherein the finite state machine loads a flash configuration table (FCT) into a second predetermined location in the RAM buffer when the power is turned on, and the routine of the first code loaded from the internal ROM comprises a receiving procedure that receives configuration information from the FCT loaded in the RAM buffer, before determining whether the cable is connected.

15. A flash memory device comprising:
a serial flash memory array;
a microprocessor including an internal RAM;
a finite state machine configured to transfer data between the serial flash memory array and the RAM; and
a random-access interface configured to enable random access of data loaded in the RAM,
wherein the finite state machine is configured to load first executable code stored in the serial flash memory array into the RAM when power is turned on, and
wherein the serial flash memory array is configured to store second executable code, and the first executable code includes a routine for loading the second executable code into the RAM.

16. The device of claim 15, wherein the first executable code is boot code, and the finite state machine is configured to transfer the boot code stored in the serial flash memory array into a first predetermined location in the RAM when the power is turned on.

17. The device of claim 16, wherein the serial flash memory array stores application code executable by the microprocessor and the boot code includes a routine for loading the application code into a main memory of the microprocessor.

18. The device of claim 15, wherein the serial flash memory array is configured to store third executable code, and the second executable code includes a routine for loading the third executable code into a main memory of the microprocessor.

19. The device of claim 15, wherein the first executable code is a boot code loader, the second executable code is boot code, and the third executable code is application code, and the routine of the boot code comprises: an initializing procedure that initializes the main memory of the microprocessor; and a loading procedure that loads the application code into the main memory.

20. A method of booting a microprocessor system using code stored in a serial flash memory array, comprising:
- loading boot code, stored in the serial flash memory array into a first predetermined location in a RAM buffer operatively connected to the serial flash memory array and being randomly accessible by a microprocessor, when power is turned on;
- executing the boot code loaded in the RAM buffer;
- loading application code stored in the serial flash memory array into a main memory of the microprocessor by executing the boot code;
- executing the application code in the main memory; and
- loading flash configuration information from a flash configuration table (FCT) stored in the serial flash memory array into a second predetermined location of the RAM buffer when the power is turned on.

21. The method of claim 20, wherein executing the boot code comprises receiving flash configuration information in a flash configuration table (FCT) stored in the serial flash memory array.

22. The method of claim 20, wherein executing the boot code comprises initializing the main memory.

23. A method of booting a microprocessor system using a flash memory device having a serial flash memory array and a RAM buffer having a random access interface, comprising:
- loading a boot code loader stored in the serial flash memory array into the RAM buffer when power is turned on;
- executing a routine of an internal ROM in a microprocessor; executing the boot code loader in the RAM buffer according to the routine of the internal ROM;
- initializing a main memory of the microprocessor according to the boot code loader;
- loading boot code stored in the serial flash memory array into the main memory according to the boot code loader;
- executing the boot code in the main memory according to the boot code loader; loading application code stored in the serial flash memory array into the main memory according to the boot code; and
- executing the application code in the main memory.

24. The method of claim 23, wherein executing the routine of the internal ROM comprises:
- determining whether a cable for updating contents stored in the serial flash memory array is connected; and
- jumping to the boot code loader loaded in RAM buffer if the cable is not connected.

25. The method of claim 24, wherein executing the routine of the internal ROM further comprises updating the contents of the serial flash memory array if the cable is connected.

26. The method of claim 24, wherein executing the routine of the internal ROM further comprises receiving flash configuration information, from a flash configuration table (FCT) loaded from the serial flash memory array into the RAM buffer when the power is turned on, before determining whether the cable is connected.

27. A flash memory device comprising:
- a serial flash memory array storing application code, and boot code having a routine for loading the application code into a main memory of a microprocessor, and a boot code loader having a routine for loading the boot code into an internal RAM in the microprocessor;
- a RAM buffer randomly accessible by the microprocessor, configured to buffer contents of the serial flash memory array; and
- a finite state machine configured to load the boot code loader into the RAM buffer when power is turned on.

28. The device of claim 27, wherein the boot code is loaded to the main memory according to the routine of the boot code loader when the boot code loader is executed in the RAM buffer, and wherein the application code is loaded into the main memory when the boot code is executed in the internal RAM.

29. The device of claim 28, wherein the routine of the boot code loader comprises:
- an initializing procedure that initializes the main memory; and
- a loading procedure that copies the boot code into the main memory.

30. A method of updating contents of a serial flash memory array using a RAM buffer, having a random-access interface, the method comprising:
- loading information stored in the serial flash memory array that facilitates a determination of whether or not executable code stored in the serial flash memory is valid into the RAM buffer;
- determining whether or not the executable code loaded from the serial flash memory array is valid; and
- checking whether a cable is connected when the executable code stored in the serial flash memory is invalid.

31. The method of claim 30, further comprising:
- executing first update code, stored in a ROM of a microprocessor and loaded in an internal RAM in the microprocessor, when the cable is connected; and
- programming second code transferred through the cable into the serial flash memory, according to a routine of the first update code.

32. The method of claim 31, wherein the second code comprises:
- application code executable by the microprocessor; and
- boot code having a routine for loading the application code to a main memory of the microprocessor.

33. The method of claim 32, wherein the second code further comprises:
- a boot code loader having a routine for loading the boot code into the internal RAM in the microprocessor; and
- a flash configuration table (FCT) indicating a boot flag and a branch address of the application code,
- wherein the boot flag indicates a type of a default cable.

34. The method of claim 32, further comprising outputting an error message when the executable code stored in the serial flash memory is invalid and the cable is not connected.

35. The method of claim 32, further comprising:
- checking whether a default cable set in a boot flag is connected when the executable code stored in the serial flash memory is valid;
- loading the second code transferred through the default cable, into the internal RAM in the microprocessor when the default cable is connected; and
- programming the second code in the serial flash memory.

36. The method of claim 35, further comprising:
- checking whether a non-default cable is connected when the default cable is not connected;
- loading third code loaded through the non-default cable, into the internal RAM in the microprocessor when the non-default cable is connected; and
- programming the third code loaded through the non-default cable into the serial flash memory.

* * * * *